(12) United States Patent
Dai et al.

(10) Patent No.: US 7,863,440 B2
(45) Date of Patent: Jan. 4, 2011

(54) MACROCYCLIC CARBODIIMIDES (MC-CDI) AND THEIR DERIVATIVES, SYNTHESES AND APPLICATIONS OF THE SAME

(75) Inventors: Shenghong A. Dai, Taichung (TW); Chih-Chia Cheng, Taichung (TW); Chien-Wen Chen, Taichung (TW); Chih-Hung Chen, Taichung (TW)

(73) Assignee: Great Eastern Resins Industrial Co., Ltd., Taichung (TW)

( * ) Notice: Subject to any disclaimer, the term of this patent is extended or adjusted under 35 U.S.C. 154(b) by 0 days.

(21) Appl. No.: 11/646,589

(22) Filed: Dec. 28, 2006

(65) Prior Publication Data

US 2008/0161554 A1 Jul. 3, 2008

(51) Int. Cl.
*C07D 255/00* (2006.01)
(52) U.S. Cl. .................................................... 540/470
(58) Field of Classification Search ........................ None
See application file for complete search history.

(56) References Cited

U.S. PATENT DOCUMENTS

| | | | |
|---|---|---|---|
| 3,755,242 | A | 8/1973 | Reich |
| 4,028,310 | A | 6/1977 | Schafer et al. |
| 4,273,717 | A | 6/1981 | Carnahan |
| 5,210,170 | A | 5/1993 | Quiring et al. |
| 5,246,993 | A | 9/1993 | Scherzer et al. |
| 5,523,362 | A | 6/1996 | Flury et al. |
| 5,597,942 | A | 1/1997 | Pohl et al. |
| 5,889,096 | A | 3/1999 | Imashiro et al. |
| 5,912,290 | A | 6/1999 | Imashiro et al. |
| 6,126,860 | A | 10/2000 | Imashiro et al. |

OTHER PUBLICATIONS

Dorwald. Side Reaction in Organic Synthesis, 2005, preface p. IX.*
P. Molina, et al., : "A generalized and efficient preparation of a novel class of macrocyclic bis (guanidines) from cyclic bis (carbodiimides)". Journal of Organic Chemistry, vol. 63, Apr. 14, 1998, pp. 2922-2927, XP002463351.
P. Molina, et al., : "A generalized and efficient preparation of a novel class of macrocyclic bis (guanidines)". Tetrahedron Letters, vol. 36, No. 51, 1995, pp. 9405-9408, XP002463352.
Chien-Wen Chen et al., "Reactive macrocyclic ether-urethane carbodiimide (MC-CDI ): Synthesis, reaction and ring-opening polymerization (ROP)". Macromolecules, vol . 40, Oct. 10, 2007, pp. 8139-8141, XP002463353.
Henri Ulrich: "Chemistry and Technology of Carbodiimides". 2007, John Wiley & Sons , pp. 227-257, XP002463360.
Definition of macrocycle, IUPAC Compendium of Chemical Terminology, 2nd Edition (1997).
J. Roovers et al., "Synthesis of High Molecular Weight Ring Polystyrenes", Macromolecules, vol., 16, No. 6, 1983, pp. 843-849.
J. A. Semlyen, "Introduction: Cyclic Polymers—The First 40 Years, Chapter 1", Cyclic Polymers, 2nd ed., pp. 1-46, Kluwer Academic Publishers, 2000.
D. J. Brunelle, "Cyclic Oligomers of Polycarbonates and Polyesters—Chapter 6", Cyclic Polyers, 2nd ed., pp. 185-228, Kluwer Academic Publishers, 2000.
Y. Ding et al., "Cyclomer Technology for High Performance Polymers, Chapter 9", Cyclic Polyers, 2nd ed., pp. 307-345, Kluwer Academic Publishers, 2000.
M. Benmouna et al., "Theoretical Aspects of Cyclic Polymers: Effect of Excluded Volume Interactions, Chapter 16", Cyclic Polymers, 2nd ed., pp. 741-790, Kluwer Academic Publishers, 2000.
C. W. Bielawski et al., "An "Endless" Route to Cyclic Polymers", Science, vol. 297, Sep. 2002, pp. 2041-2044.
D. J. Brunelle, et al., "Preparation and Polymerization of Cyclic Oligomeric Carbonates: New Route to Super-High Molecular Weight Polycarbonate an Overview", Polymer Preprints, 1989, 30, pp. 569-570.
E. P. Boden, et al., "Efficient Preparation of Cyclic Oligomeric Bisphenol a Carbonates: Mechanism for selective Formation of Cyclic Oligomers", Polymer Preprints, 1989, 30, 571-572.
T. L. Evans, et al., "Fundamentals of Cyclic BPA Carbonate Oligomer Ring-Opening Polymerization", Polymer Preprints, 1989, 30, 573-574.
K. R. Stewart, "Melt Polymerization of BPA Cyclic Polycarbonate Oligomers: Rehokinetics of Polymerization Relevant to Reactive Processing", Polymers Preprints, 1989, 30, pp. 575-576.
R. Richter, et al., "1,13-Diazabicyclo[11.1.1]pentadecane-14,15-dione and 1,12-Diazabicyclo[10.1.1] tetradecane-13,14-dione. Two Novel Aliphatic Diisocyanate Dimers", J. Org. Chem., 1981, 46, pp. 5226-5228.
R. Richter, et al., "Reaction of Cycloaliphatic Carbodiimides with Oxalyl Chloride", J. Org., Chem., 1986, 51, 417-419.
P. Molina, et al., "A New and Efficient Preparation of Cyclic Carbodiimides from Bis(iminophosphoranes) and the System Boc2O/Bmap", J. Org. Chem., 1994, 59, pp. 7306-7315.
P. Molina, et al., "New Models for the Study of the Racemization Mechanism of Carbodiimides, Synthesis and Structure (X-ray Crystallography and 1H NMR) of Cyclic Carbodiimides", J. Org. Chem., 1996, 61, pp. 4289-4299.

(Continued)

*Primary Examiner*—James O Wilson
*Assistant Examiner*—Noble Jarrell
(74) *Attorney, Agent, or Firm*—Sughrue Mion, PLLC

(57) ABSTRACT

Disclosed are a macrocyclic carbodiimide (MC-CDI) and a process for synthesizing the same through condensation of a molecule with multiple-isocyanate terminal functional groups under high dilution in the presence of a phospholene catalyst such as phospholene or arsenic catalyst. Also disclosed are MC-CDI derivatives, such as MC-urea (MC-U), MC-acylurea (MC-ACU), acid functionalized MC-ACU, and anhydride functionalized MC-ACU, processes for synthesizing the same, and the applications of such derivatives as hydrolysis stabilizers in organic polymeric materials, such as polyurethane (PU) and polyesters, as well as the applications in the syntheses of the amide- and imide-modified polyurethane by ring-opening reaction of the MC-ACU.

6 Claims, 5 Drawing Sheets

OTHER PUBLICATIONS

P. Molina, et al., "A Generalized and Efficient Preparation of a Novel Class of Macrocyclic Bis(guanidines) from Cyclic Bis(carbodiimides)", J. Org. Chem., 1998, 63, pp. 2922-2927.

Tetrahedron Report R101 in Tetrahedron, Recent developments in the carbodiimide chemistry (vol. 37, pp. 233-284, 1981), p. 235.

W. Neumann et al., "The Preparation of Carbodiimides from Isocyanates", Agnew. Chem. Internt. Edit., vol. 1, No. 12, 1962, pp. 621-625.

R. Richter, B. Tucker, H. Ulrich, J. Org. Chem., 1983, 48 1694.

* cited by examiner

MACROCYCLIC CARBODIIMIDES (MC-CDI) AND THEIR DERIVATIVES, SYNTHESES AND APPLICATIONS OF THE SAME

FIELD OF THE INVENTION

The present invention relates to a macrocyclic carbodiimide (MC-CDI) and a process for synthesizing the same. The MC-CDI can be further converted into macrocyclic acylurea (MC acylurea, MC-ACU) and macrocyclic urea (MC-urea, MC-U) and so on. MC-CDI can be used as an additive to serve as a hydrolysis stabilizer for an organic polymeric material. Because facile formation of isocyanate group could be achieved upon thermolysis of acylureas, acid or anhydride functionalized MC-ACU can be used as an intermediate in the syntheses of modified linear PUs.

BACKGROUND OF THE INVENTION

According to the definitions of IUPAC, a macrocycle (MC) is a cyclic polymer generally containing more than 15 atoms (see IUPAC Compendium of Chemical Terminology 2nd Edition (1997)). The cyclic polymer or macrocycle has a variety of interesting physical properties, which are different from those of a common linear molecule and linear polymer (see J. Roovers, P. M. Toporowski, Macromolecules 1983; 16, 843; J. A. Semlyen, Cyclic polymers, 2nd ed. Dordrecht: Kluwer Publishers, 2000; and C. W. Bielawski, D. Benitez, R. H. Grubbs, Science 2002, 297, 2041), such as low viscosity, high solubility, and relatively low hydrodynamic volume. In recent years, in the development of polymer science and application, for example, discovering a polymer that has good compatibility with a solvent in a solution so as to lower the viscosity and increase the solubility has attracted considerable research interest. These occurrences mostly result from relatively less terminal functional groups in the structure of the cyclic polymer, leading to the distinctive properties that are different from those of a linear molecule and linear polymer. Presently, characteristic determinations of the cyclic polymer structure are primarily based on the low-hydrodynamic volume property of the cyclic polymer.

In the 1980s, many studies were involved with the syntheses of the cyclic oligomers and the applications thereof in the ring-opening polymerization. The study on the oligomeric cyclic carbonates of GE corporation, U.S., is the most celebrated case and shows great business potential (see J. C. Carnahan, U.S. Pat. No. 4,273,717 (1981); D. J. Brunelle, T. L. Evens, et al., Polymer Preprints 1989, 30, 569; E. P. Boden, D. J. Brunelle, et al., Polymer Preprints 1989, 30, 571; T. L. Evens, C. B. Berman, et al., Polymer Preprints 1989, 30, 573; K. R. Stewart, Polymer Preprints 1989, 30, 575). This process involves preparing a precursor, i.e., bisphenol A bischloroformate, from bisphenol A, followed by synthesizing oligomeric cyclic carbonates under pseudo-high dilution. The oligomeric cyclic carbonate is subject to ring-opening polymerization over an anionic catalyst, and converted into polycarbonate (PC) with a high molecular weight in an extruder at 250° C. for 2-5 minutes. Furthermore, due to the low viscosity of the oligomeric cyclic carbonates, the production capacity can be increased, and the difficulties in injection molding for a large object become solvable. This processing method with the macrocycle as a raw material in the reaction injection molding will be an important technology in the polymer industry.

However, it is necessary for the ring-opening polymerization of the oligomeric cyclic carbonates to be conducted under an elevated temperature above 250° C. to yield the product with high Tg and high molecular weight. Apparently, the polymer material prepared by the ring-opening polymerization of macrocycles has a disadvantage that the production mode has high energy consumption.

The syntheses of cyclic CDI involve two main species, which are aliphatic and aromatic cyclic CDI, respectively. R. Richter, et al. taught a process for synthesizing tridecacycloaliphatic CDI, which was a small ring cycloaliphatic CDI, by using 2-azacyclododecanone as an initiator (see R. Richter, B. Tuker, H. Ulrich, J. Org. Chem. 1981, 46, 5226; R. Richter, B. Tuker, H. Ulrich, J. Org. Chem. 1983, 48, 1894; and R. Richter, E. A. Barsa, J. Org. Chem. 1986, 51, 417). In addition, cycloaromatic CDI was not successfully synthesized until 1994 by P. Molina et al. (referring to P. Molina, M. Majarin, and P. Stinchez-Andrada, J. Org. Chem. 1994, 59, 7306; P. Molina, M. Majarin, and P. Stinchez-Andrada, J. Org. Chem. 1996, 61, 4289; and P. Molina, M. Majarin, and P. Stinchez-Andrada, et al., J. Org. Chem. 1998 63, 2922). However, for the method according to Molina, it was necessary to first prepare the costly intermediate, i.e., azophosphorane (N=P), and then perform the aza-Wittig reaction with a reagent, i.e., tBac$_2$O/4-(dimethylamino)pyridine (DMAP), and the cyclization under high dilution to give a small ring cycloaromatic CDI.

In 1991, Nippon Painting Corporation, Japan, successfully synthesized linear diisocyanate by directly reacting six-membered ring cyclopropylene urea with bischloroformate to yield bis(cyclopropylene acylurea), and then performing ring-opening reaction of cyclopropylene acylurea by means of thermolysis, with the thermolysis property of N-acyl-N, N'-disubstituted urea to generate amide and isocyanate. Although cyclic acylurea has been successfully prepared, the initial raw material, i.e., cyclopropylene urea, is expensive, and merely a small ring cyclic (i.e., hexacyclo) acylurea could be obtained. This limits its applications.

Until now, an effective intermediate for synthesizing a cyclic polymer or macrocyclic intermediate has not been developed, and neither has an effective cyclic intermediate for synthesizing another cyclic functionalized polymer intermediates. Accordingly, the present invention is directed to a method for synthesizing macrocyclic CDI. Furthermore, MC-ACU can be produced by reacting the macrocyclic CDI with an organic acid in high selectivity, which may be further used as a novel MC-polymer intermediate for synthesizing an organic polymeric material, such as modified polyurethane (PU). In addition, the CDI functional groups in the macrocycle can react with carboxylic acid and water, and thus, the MC-CDI according to the present invention also can be added into a polymeric material as a dehydrating agent and an acid scavenger to further improve the durability of the polymeric material.

SUMMARY OF THE INVENTION

Accordingly, the present invention is directed to a macrocyclic carbodiimide (MC-CDI) and a process for synthesizing the same through the high dilution of a molecule with multiple isocyanate terminal functional groups and the condensation of the isocyanate functional groups in the presence of a phospholene catalyst to yield a macrocycle with a carbodiimide functional group.

The present invention is still directed to a macrocyclic acylurea (MC-ACU) and a process for synthesizing the same. The process comprises the high dilution of the molecule with multiple-isocyanate terminal functional groups and the condensation of the isocyanate functional groups in the presence of a phospholene catalyst to give an MC-CDI, as well as the reaction of the MC-CDI with a monocarboxylic acid, dicarboxylic acid, polycarboxylic acid, or mixtures thereof, at a temperature of less than about 80° C. to obtain the MC-ACU.

The present invention is further directed to an MC-ACU and a process for synthesizing the same. The process comprises the high dilution of the molecule with multiple aryl isocyanate terminal functional groups and the condensation of isocyanate functional groups in the presence of a phospholene catalyst to give an aromatic MC-CDI, as well as the reaction of the aromatic MC-CDI with a monocarboxylic acid, a dicarboxylic acid, a polycarboxylic acid, or mixtures thereof, at a temperature of less than about 80° C. to obtain the MC-ACU.

The present invention is further directed to a macrocyclic urea (MC-U) and a process for synthesizing the same. The process comprises the high dilution of the molecule with multiple isocyanate terminal functional groups and the condensation of isocyanate functional groups in the presence of the phospholene catalyst to give an MC-CDI, as well as the reaction of the MC-CDI with water at a temperature in a range of 0° C.-105° C. to obtain the MC-U.

The present invention is further directed to an acid functionalized/anhydride functionalized MC-ACU and a process for synthesizing the same. The process comprises the high dilution of the molecule with multiple isocyanate terminal functional groups and the condensation of isocyanate functional groups in the presence of the phospholene catalyst to prepare MC-CDI, as well as the reaction of the MC-CDI with a dicarboxylic acid/trimellitic anhydride at a temperature of less than about 80° C. to obtain the acid functionalized/anhydride functionalized MC-ACU.

The present invention is also directed to a method for purifying an MC-CDI, in which an MC-CDI bearing mono-CDI group is isolated through a liquid column chromatography (LC).

The present invention is further directed to a method for synthesizing a linear organic polymer with cyclic polymer intermediate, which comprises dissolving an aryl anhydride, an aryl ortho-dicarboxylic acid, an aryl ortho-monocarboxylic acid monoester, an aliphatic carboxyl or aliphatic hydroxyl functionalized MC-ACU in an inert organic solvent, and heating the solution to a temperature of 90-200° C. to carry out the ring-opening reaction to further polymerize the functionalized MC-ACU into a linear modified polyurethane polymeric material.

The present invention is further directed to the use of MC-CDI as a hydrolysis stabilizer for an organic polymeric material, which is capable of efficiently removing acid and moisture in a polymeric material so as to prevent the polymeric material from being hydrolyzed and degrading.

The present invention is directed to a method for preventing an organic polymeric material from being hydrolyzed, which comprises adding an MC-CDI into an organic polymeric material, and reacting a carbodiimide functional group of the MC-CDI with a carboxylic acid functional group in the organic polymeric material to yield an N-acylurea functional group and a urea functional group, thereby lowering the content of the carboxylic acid functional group and water in the organic polymeric material.

According to the disclosure and claims as follows, those skilled in the art would readily recognize the various advantages and objects of the present invention.

DEFINITIONS

Figure 1:
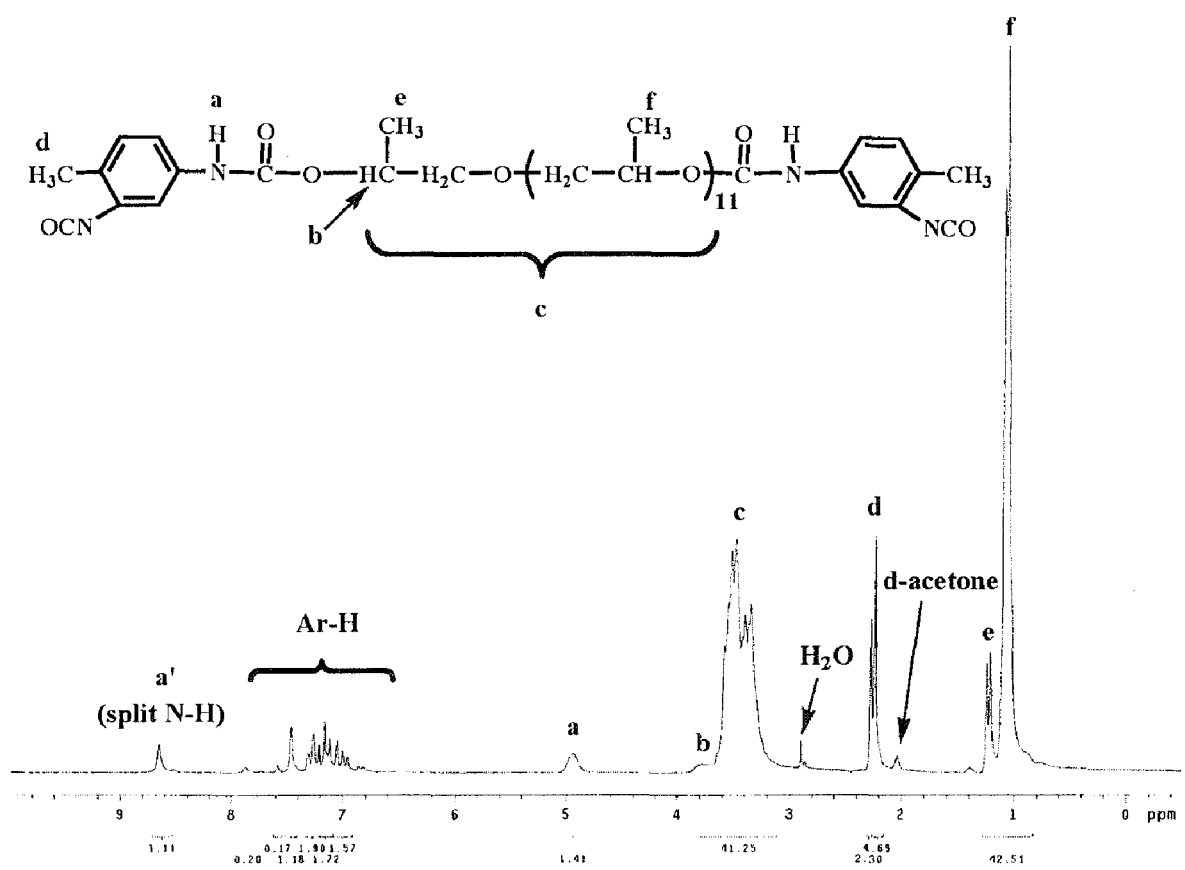
FIG. 1 shows a $^1$H-NMR spectrogram of the isocyanate prepolymer (T2P700) according to Example 1 of the present invention, testing with d-acetone as a solvent.

The carbodiimide (CDI) is a molecule with a carbodiimide functional group.

The macrocyclic carbodiimide (MC-CDI) is a macrocyclic structure with at least one carbodiimide functional group; and the cyclic carbodiimide is a cyclic molecule with at least one carbodiimide functional group. In commonly known literature, all the examples of the cyclic carbodiimide are cyclic molecules with low molecular weights. However, in the present invention, the MC-CDI and the cyclic carbodiimide are the same, having a molecular weight of at least greater than 400.

The macrocyclic-acylurea (MC-acylurea, MC-ACU) is a macrocycle with at least one N-acylurea functional group; and the cyclic acylurea is a cyclic molecule with at least one N-acylurea functional group, generally a small cyclic molecule. However, in the present invention, the MC-ACU and the cyclic acylurea are the same.

The macrocyclic urea (MC-urea, MC-U) is a macrocycle with at least one urea functional group; the cyclic urea is a cyclic molecule with at least one urea functional group, generally a small cyclic molecule. However, in the present invention, the MC-U and the cyclic urea are the same.

The acid functionalized MC-ACU is an MC-ACU with at least one carboxylic acid functional group in the terminal of hydrocarbon groups which connect to the MC-ring; and the acid functionalized cyclic acylurea is a cyclic acylurea with at least one carboxylic acid functional group in the terminal of hydrocarbon groups which connect to the cyclic ring, generally a small cyclic molecule. However, in the present invention, the acid functionalized MC-ACU and the acid functionalized cyclic acylurea are the same.

The anhydride functionalized MC-ACU is an MC-ACU with at least one anhydride functional group in the terminal of hydrocarbon groups which connect to the MC-ring; and the anhydride functionalized cyclic acylurea is a cyclic acylurea with at least one anhydride functional group in the terminal of hydrocarbon groups which connect to the cyclic ring, generally a small cyclic molecule. However, in the present invention, the anhydride functionalized MC-ACU and the anhydride functionalized cyclic acylurea are the same.

DETAILED DESCRIPTION OF THE INVENTION

Carbodiimide (CDI)

The carbodiimide compounds have extensive usage, such as a dehydrating agent in organic synthesis, a hardener in aqueous resins and a liquification modifier for 4,4'-MDI in PU industry. As far as the prior known art of synthesis, CDI can react with a carboxylic acid to yield an anhydride and an N,N'-disubstituted urea, or to yield an N-acyl-N,N'-disubstituted urea (abbreviated to N-acylurea) adduct. The reaction direction depends on the species of CDI, i.e., aromatic CDI or aliphatic CDI. The reaction of an aromatic CDI and a carboxylic acid can yield an N-acylurea in high selectivity, while the reaction of an aliphatic CDI with a carboxylic acid can yield a mixture of anhydride and urea.

In Scheme 1, the syntheses of N-acylurea E from the reaction of an aromatic CDI A and a carboxylic acid B and the possible byproducts are described; in which two parallel reaction routes occur. The initially formed O-isoacylurea intermediate can be rearranged into N-acylurea E, or substituted with an additional acid molecule to yield the corresponding anhydride C and urea D as the final products. N-acylurea E is stable at a temperature of less than about 80° C., while it is known that N-acylurea E will be decomposed into isocyanate and amide at a high temperature.

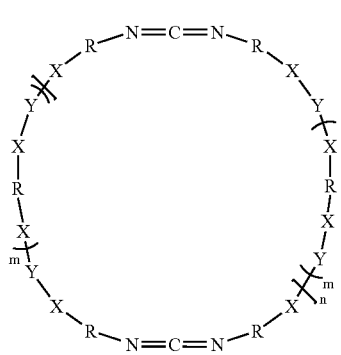

3

Scheme 1

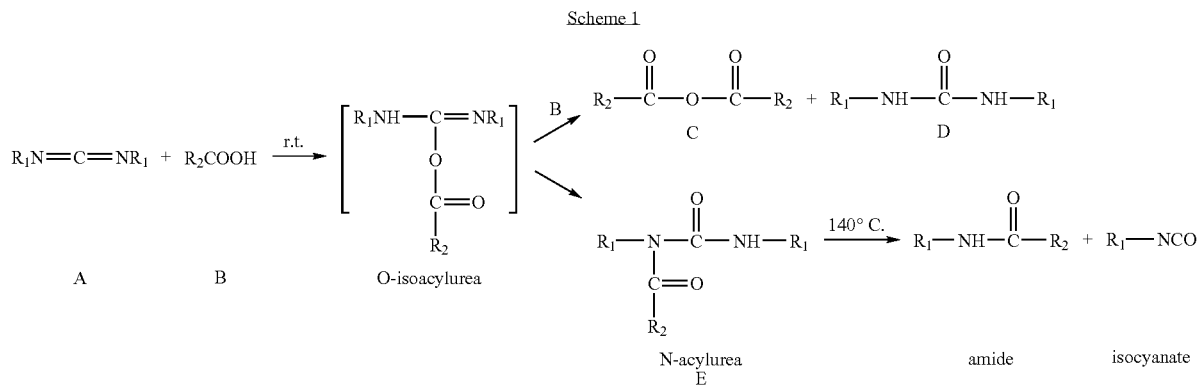

MC-CDI

First, the present invention provides an MC-CDI, especially an MC-CDI of Formula 1

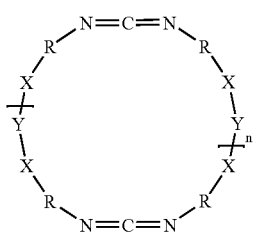

1 wherein:

R is an aryl group or an aliphatic group;

X is urethane (NHCOO) or urea (NHCONH);

Y is any one of polyether, polyester, poly(ester-ether), polycarbonate, poly(carbonate-ether), polyolefin, or poly(olefin-ether), having a molecular weight from 100 to 7000;

n is an integer from 0 to 10.

The present invention also provides an MC-CDI of Formula 3, wherein:

R, X, Y, and n are as defined for the MC-CDI of Formula 1;

m is an integer from 1 to 5.

The present invention also provides an MC-CDI of Formula 5,

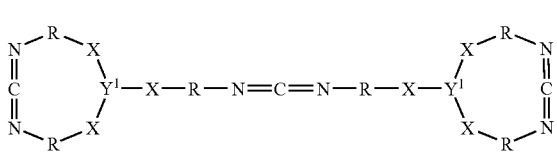

5 wherein:

R and X are as defined for the MC-CDI of Formula 1;

$Y^1$ is any one of polyether, polyester, or poly(ester-ether), having a molecular weight from 100 to 7000.

The present invention also provides an MC-CDI of Formula 7,

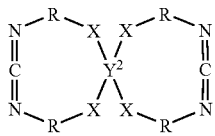

wherein:

R and X are as defined for the MC-CDI of Formula 1;

Y² is any one of polyether, polyester, or poly(ester-ether), having a molecular weight from 100 to 7000.

In the above-described MC-CDI of Formula 1, 3, 5, or 7 according to the present invention, the preferred R is

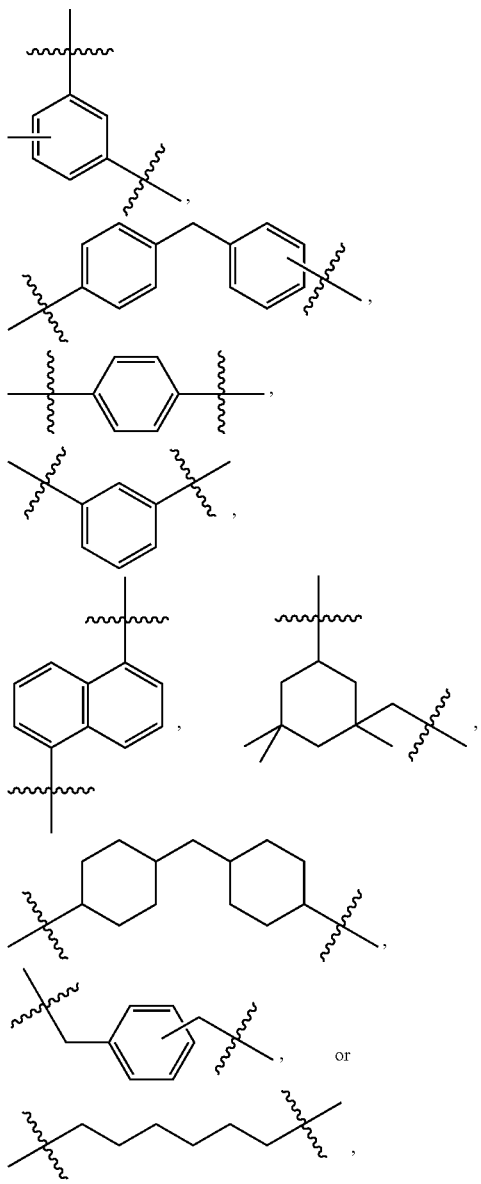

Process for Preparing MC-CDI

The present invention provides a process for synthesizing MC-CDI through the high dilution of a molecule with multiple isocyanate terminal functional groups, preferably to a concentration of less than 0.02 M, more preferably less than 0.015 M, and the condensation of the isocyanate functional groups in the presence of CDI catalyst.

According to the present invention, the molecule with multiple isocyanate terminal functional groups is an isocyanate prepolymer, formed by polyether, polyester, poly(ester-ether), polycarbonate, poly(carbonate-ether), polyolefin, or poly(olefin-ether) with multiple terminal hydroxyl or amino groups and polyisocyanate. The polyisocyanate molecules are mainly classified into those including aryl isocyanates or aliphatic isocyanates The species of aryl isocyanate is not particularly limited. Suitable aryl isocyanates include, but are not limited to, aryl di-isocyanates, aryl polyisocyanates, and mixtures thereof. The preferred aryl isocyanates include toluene diisocyanate (TDI), diphenylmethane diisocyanate (MDI), para-phenylene diisocyanate (PPDI), meta-phenylene diisocyanate (m-PDI), naphthalene diisocyanate (NDI), and mixtures of diisocyanates described above; the more preferred one is 2,4-toluene diisocyanate (2,4-TDI). The species of aliphatic isocyanates is not particularly limited. Suitable aliphatic isocyanates include isophorone diisocyanate (IPDI), dicyclohexylmethane diisocyanate (H12MDI), xylylene diisocyanate (XDI), hexane diisocyanate (HDI), preferably isophorone diisocyanate (IPDI).

The isocyanate prepolymer is a key intermediate in the synthesis industry of polyurethane (PU), which is typically used in the production of plastics, elastomer, painting, adhesives, and foam. Generally, the isocyanate terminated prepolymer is obtained by reacting a diisocyanate with a polyol with a stoichiometric ratio of NCO to OH greater than 2. Since the reactivity of isocyanate is influenced by chemical configurations, such as steric hindrance and the electric push-pull effect of substituents, the diisocyanates for preparing the prepolymer include symmetric and asymmetric diisocyanates.

In a method according to the present invention, the symmetrical and asymmetrical diisocyanates both can be used. In the synthesis of MC-CDI and related, macrocyclic derivatives, the molecule is preferably an asymmetrical diisocyanate. Because the NCO functional groups in the molecule of symmetrical diisocyanate have similar reactive activities, when synthesizing a prepolymer, a diisocyanate molecule has an opportunity to bond with two polyol molecules to yield a component having a high molecular weight, which can increase the viscosity of the product, and increase the content of the free diisocyanate in the product. However, because the asymmetrical diisocyanate molecule has two NCO functional groups with significant differences in activity, when the NCO with high activity bonds with a polyol, due to the other one with low activity, it is unlikely to have the chain extension. When utilizing this activity difference of NCO functional groups and an appropriate adjustment in stoichiometry, the isocyanate prepolymer is endowed with the properties of narrow molecular weight (MW) dispersion, low viscosity, and less free monomer.

The most typical examples of the asymmetrical diisocyanates are toluene diisocyanate (TDI), especially 2,4-TDI, and isophorone diisocyanate (IPDI).

According to the present invention, the isocyanate prepolymers are preferably prepared by reacting the asymmetrical diisocyanate and polyether polyol with multiple secondary hydroxyl terminal groups. Taking the reaction of 2,4-TDI (an aryl isocyanate) and poly(propylene glycol) diols (molecular weight of 192 to 2000, PPG, i.e., TPG, PPG400, PPG700 and PPG2000), which has a secondary alcohol in the terminal, the prepolymers with various molecular weights are obtained and used as important precursors for the cyclization reaction shown in Scheme 2.

Scheme 2

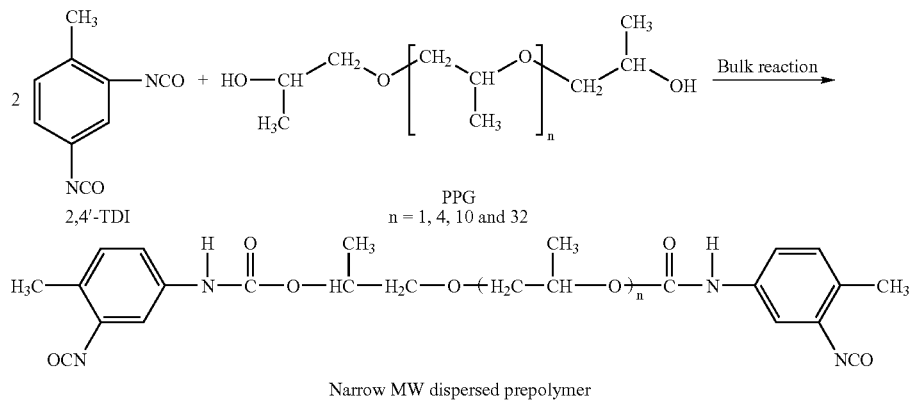

In the present invention, preparing the narrow MW dispersed TDI prepolymer is preferred, so as to be beneficial to the subsequent cyclization reaction and the preparation of a cyclic product in high selectivity. The cyclization reaction is conducted at a temperature ranging from normal temperature to 150° C., preferably from 50° C. to 120° C. for the aromatics, and preferably from 120° C. to 150° C. for the aliphatics. Because of high reactivity of isocyanate groups toward moisture, it is preferred to carry out the cyclization reaction of the isocyanate prepolymers to MC-CDI immediately after their syntheses. According to the present invention, the resultant narrow MW dispersed isocyanate prepolymer is highly diluted in an organic solvent, and then is intra-molecularly condensed in the presence of a phospholene catalyst to prepare MC-CDI, with a yield of 20%-80%, preferably about 50%, more preferably about 70%. The reaction flowchart of the intramolecular cyclization is shown in Scheme 3.

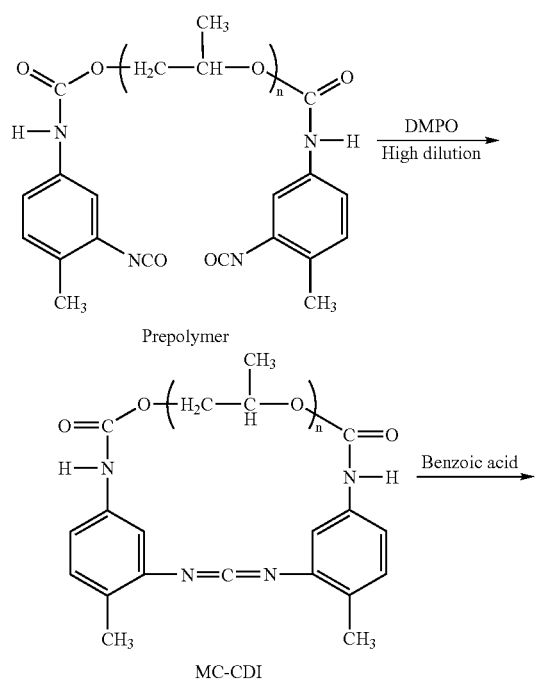

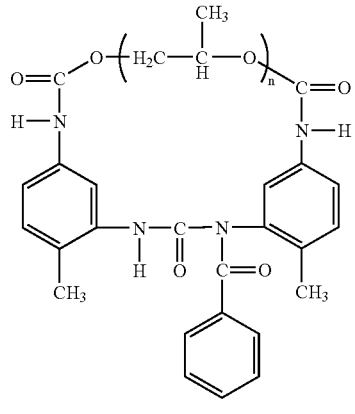

In the present invention, an appropriate solvent is an inert organic solvent which will not react with the isocyanate functional groups and the CDI functional groups during the cyclization. The solvent includes, but is not limited to, petroleum ether, cyclohexane, toluene, xylene, or mixtures thereof, preferably toluene or xylene, depending on the temperature required for the cyclization. The species of the phospholene catalyst have been extensively recorded in the literature and are known to those skilled in the art. The appropriate CDI catalysts include, but are not limited to, a variety of organic derivatives from cyclic phosphorous compounds, for example, 3-methyl-3-phospholene oxide (MPO), 1,3-dimethyl-3-phospholene oxide (DMPO), 3-methyl-1-phenyl-3-phospholene oxide (MPPO), 1,3-dimethyl-1,3,2-diazaphosphorolidine, triphenylarsenic oxide, and the phospholene catalysts recorded in Tetrahedron Report R101 in Tetrahedron (Vol. 37, pages 233-284, 1981), page 235; and Angew. Chem. internt. Edit. Vol. 1, 621 (1962). The disclosures of this literature are incorporated herein for reference.

Embodiments of Process for Preparing MC-CDI

In the present invention, a first embodiment involves providing a process for preparing an MC-CDI of Formula 1,

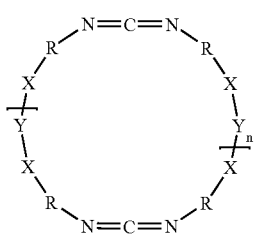

1 comprising the following steps:

(1) high dilution of a molecule of Formula 2 with an inert organic solvent;

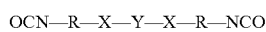

OCN—R—X—Y—X—R—NCO    2

(2) condensation of isocyanate functional groups of the molecule of Formula 2 in the presence of a phospholene catalyst;

wherein:

R is an aryl group or an aliphatic group;

X is urethane (NHCOO) or urea (NHCONH);

Y is any one of polyether, polyester, poly(ester-ether), polycarbonate, poly(carbonate-ether), polyolefin or poly(olefin-ether), having a molecular weight from 100 to 7000;

n is an integer from 0 to 10;

thereby yielding the MC-CDI.

In the present invention, a second embodiment involves providing a process for preparing an MC-CDI of Formula 3,

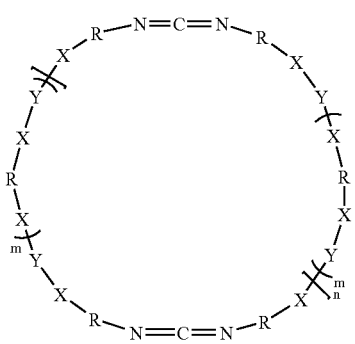

3 comprising the following steps:

(1) high dilution of a molecule of Formula 4 with an inert organic solvent;

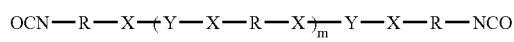

OCN—R—X—(Y—X—R—X)$_m$—Y—X—R—NCO    4

(2) condensation of isocyanate functional groups of the molecule of Formula 4 in the presence of a phospholene catalyst;

wherein:

R, X, Y, and n are as defined in the first embodiment;

m is an integer from 1 to 5;

thereby yielding the MC-CDI.

In the processes according to the first and the second embodiments of the present invention, the resultant MC-CDI is an MC-CDI having 1 to 11 carbodiimide functional groups or mixtures thereof. Moreover, in the processes according to the first (second) embodiment of the present invention, the molecule of Formula 4 (the molecule of Formula 2) can also be added in Step (1) and highly diluted, or alternatively, the molecules of Formula 2 and Formula 4 are present as a mixture before high dilution with the inert organic solvent. For the latter, after the high dilution of the mixture of the molecules of Formula 2 and Formula 4 with the inert organic solvent, condensation of the isocyanate functional groups is conducted in the presence of a phospholene catalyst to yield the MC-CDI or mixtures thereof. The mixture of the molecules of Formula 2 and Formula 4 is a representative example of the molecules with multiple isocyanate terminal functional groups.

In the present invention, a third embodiment involves providing a process for preparing an MC-CDI of Formula 5,

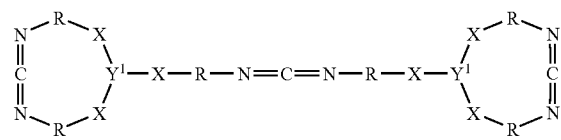

5 comprising the following steps:

(1) high dilution of a molecule of Formula 6 with an inert organic solvent;

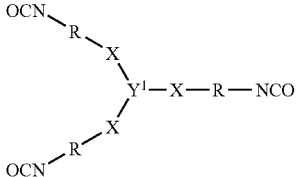

6

(2) condensation of isocyanate functional groups of the molecule of Formula 6 in the presence of a phospholene catalyst;

wherein:

R and X are as defined in the first embodiment;

$Y^1$ is any one of polyether, polyester, or poly(ester-ether), having a molecular weight from 100 to 7000;

thereby yielding the MC-CDI.

In the present invention, a fourth embodiment involves providing a process for preparing an MC-CDI of Formula 7,

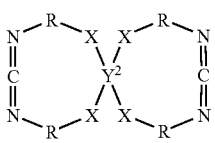

7 comprising the following steps:

(1) high dilution of a molecule of Formula 8 with an inert organic solvent;

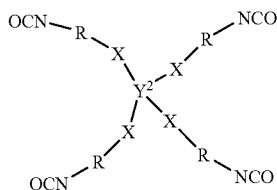

8

(2) condensation of isocyanate functional groups of the molecule of Formula 8 in the presence of a phospholene catalyst;

wherein:

R and X are as defined in the first embodiment;

$Y^2$ is any one of polyether, polyester, or poly(ester-ether), having a molecular weight from 100 to 7000;

thereby yielding the MC-CDI.

In the processes according to the first to the fourth embodiments of the present invention, in the resultant MC-CDI of Formula 1, 3, 5, or 7, the preferred R is

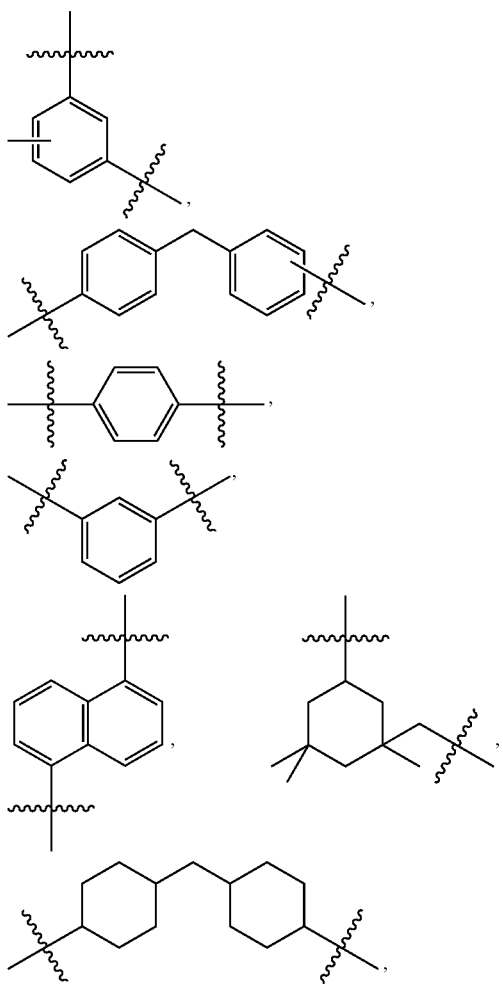

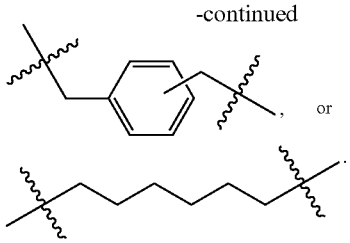

, or

.

Use of MC-CDI

Carbodiimide Hydrolysis Stabilizer

The ester group or acid group in the organic polymeric materials has always been a major factor in causing the service performance thereof to be degraded. The ester group may be hydrolyzed in the presence of moisture into an acid group and an alcohol group, and the hygroscopicity of both the ester group and the acid group and the acidity of the acid group can further accelerate the hydrolysis of the ester group. Therefore, the durability of organic polymeric materials can by improved by inhibiting the hydrolysis of the ester group, i.e., removing the acid residue in the polymers and the moisture.

To solve this problem, the hydrolysis stabilizers with carbodiimide are mostly used in the current market. The additives mainly include the mono-carbodiimide and the poly-carbodiimide. The mono-carbodiimide, such as di(2,6-diisopropylphenyl)carbodiimide and dicyclohexylcarbodiimide (DCC), has a low melting point, and can be easily and uniformly mixed with an organic polymeric material. However, this additive has a low MW, so it is incompatible with an organic polymeric material in some cases and is also likely to be volatile or sublimed, and lost under an elevated temperature processing. Furthermore, the small molecular additive has a high reactivity and is likely to react with the moisture to produce a small molecular urea incompatible with the original polymers. These disadvantages not only reduce the efficiency against hydrolysis stability, but also impact the service quality of the material. The poly-carbodiimides, such as the aryl polycarbodiimide with steric hindrance disclosed in U.S. Pat. No. 5,210,170, and the aliphatic polycarbodiimides with steric hindrance disclosed in U.S. Pat. No. 5,889,096, U.S. Pat. No. 5,912,290 and U.S. Pat. No. 6,126,860, are mainly synthesized from diisocyanates, and have a rigid molecular chain, in which the carbodiimide functional groups are densely bonded to the same molecular chain and thus lack mobility. Although the poly-carbodiimide has a high MW and is compatible with an organic polymeric material, the carbodiimide functional groups are not readily dispersed in an organic polymeric material due to the relatively high melt viscosity. Therefore, the moisture and the acid group of the organic polymeric material cannot be removed effectively by the poly-carbodiimide.

MC-CDI as Hydrolysis Stabilizer

Accordingly, the present invention provides an MC-CDI, which can be prepared by the processes according to any one of the first to the fourth embodiments and can be used as a hydrolysis stabilizer for an organic polymeric material. Being different from the polycarbodiimide synthesized from diisocyanates, the MC-CDI has an additional soft chain segment from polyether, polyester, poly(ester-ether), polycarbonate, poly(carbonate-ether), polyolefin, or poly(olefin-ether), so that the spacing distance between the carbodiimide functional groups can be increased, and the lack of mobility caused by the excessive carbodiimide functional groups on the hard chain segment can be improved. By regulating the category and length of the soft segment and the structure of the hard segment, the MC-CDI molecule according to the present invention can be customized for a special organic polymeric material, so as to increase the compatibility thereof with the special organic polymeric material. For example, the carbodiimide functional group of the MC-CDI molecule can react with the carboxylic acid functional group in the polymeric material to form an N-acylurea functional group, so that the MC-CDI additive is covalently bonded to the organic polymeric material. In addition, the carbodiimide functional group of the MC-CDI can react with the carboxylic acid functional group in the polymeric material to produce an acylurea functional group; or alternatively, the carbodiimide functional group of the MC-CDI can also react with moisture in the polymeric material to produce a urea functional group; thereby the content of the carboxylic acid functional group and moisture in the organic polymeric material can be reduced, and the degradation of the organic polymeric material caused by acidic catalyzed hydrolysis can also be minimized.

Furthermore, the low melt-viscosity property of the MC-CDI further facilitates the stable dispersion of the carbodiimide functional groups in the organic polymeric material.

The organic polymeric material is selected from the group consisting of polyester, polyamide, polyurethane, polyurea, poly(urethane-urea), carboxylated acrylic resin, carboxylated aqueous resin, polymers containing at least one polymer described above, mixtures thereof, and blocked polymer thereof.

The present invention also provides a process for preventing the organic polymeric material from being hydrolyzed, comprising adding MC-CDI prepared by the process according to any of the first to the fourth embodiments to an organic polymeric material, and reacting the carbodiimide functional group of the MC-CDI with the carboxylic acid functional group in the organic polymeric material to form an N-acylurea functional group and a urea functional group. The contents of the carboxylic acid functional group and moisture in the organic polymeric material are reduced, and the degradation of the organic polymeric material caused by the acidic catalyzed hydrolysis is prevented, in which the organic polymeric material is as described above.

MC-CDI as Chain Extender

MC-CDI according to the present invention can be added to a recovered waste of thermoplastic organic polymeric material as a chain extender because the carbodiimide functional group of the MC-CDI can react with the terminal carboxylic acid functional groups in the thermoplastic organic polymeric material to form N-acylurea functional groups. That is, the MC-CDI additive becomes covalently bonded to the organic polymeric material. Under an elevated temperature processing, the newly formed N-acylurea functional groups ring-opened to form a new connecting amide groups in the polymer chain and isocyanate groups at the polymer terminal, so the thermoplastic organic polymeric material re-creating a new reacting functional group in the molecular chain end, and further can react with any active hydrogen functional groups in the polymer or moisture to increase the MW of the recovered thermoplastic organic polymeric material.

The thermoplastic organic polymeric material is selected from the group consisting of polyester, polyamide, polyurethane, polyurea, poly(urethane-urea), polymers containing at least one polymer described above, mixtures thereof, and blocked polymers thereof.

Purification of MC-CDI

The purification of the MC-CDI according to the present invention is aimed to isolate pure MC-mono-CDI products and to carry out precise structural identifications. In the present invention, it is unexpectedly found that the MC-CDI is capable of stably existing in various organic solvents and being eluted by thin layer chromatography (TLC). It is found from the results of TLC that the MC-CDI having ring structure is compatible with the solvent due to the low hydrodynamic volume property. Therefore, the pure mono-cyclic CDI and the linear CDI can be effectively distinguished on TLC. Based on the finding by TLC, the present invention provides a method for purifying and isolating MC-mono-CDI by purification of the monocyclic MC-CDI in liquid column chromatography (LC) and isolation of the monocyclic MC-CDI with high purity, maintaining the structure and activity thereof for positive chemical identification by Elemental Analysis, Mass Spectroscopy and NMR.

MC-ACU, Functionalized MC-ACU

The present invention provides MC-ACU, and functionalized MC-ACU, such as acid functionalized MC-ACU and anhydride functionalized MC-ACU, for example, aryl anhydride, aryl ortho-dicarboxylic acid, aryl ortho-monocarboxylic acid monoester, aliphatic carboxyl or aliphatic hydroxyl functionalized MC-ACU.

The present invention provides an MC-ACU of Formula 9,

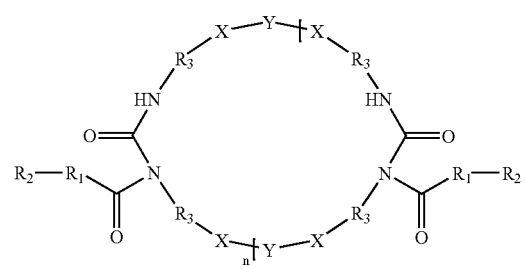

9 wherein:

$R_3$ is an aryl group;

X, Y, and n are as defined for the MC-CDI of Formula 1;

$R_1$ is a hydrocarbon free radical having 2 to 20 carbon atoms;

$R_2$ is a carboxyl or an aliphatic hydroxyl.

The present invention also provides an MC-ACU of Formula 11,

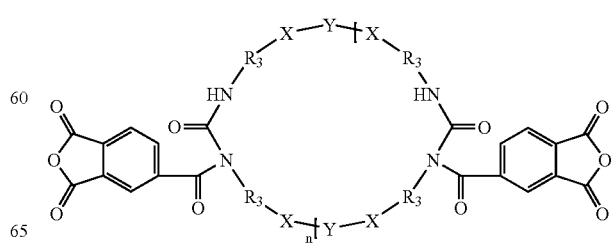

11 wherein:
$R_3$ is an aryl group;
X, Y, and n are as defined for the MC-CDI of Formula 1.

The present invention also provides an MC-ACU of Formula 12,

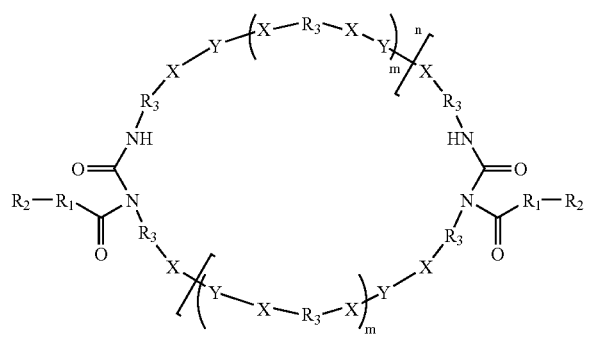

12 wherein:
$R_3$ is an aryl group;
X, Y, m, and n are as defined in MC-CDI of Formula 3;
$R_1$ is a hydrocarbon free radical having 2 to 20 carbon atoms;
$R_2$ is a carboxyl or an aliphatic hydroxyl.

The present invention also provides an MC-ACU of Formula 13,

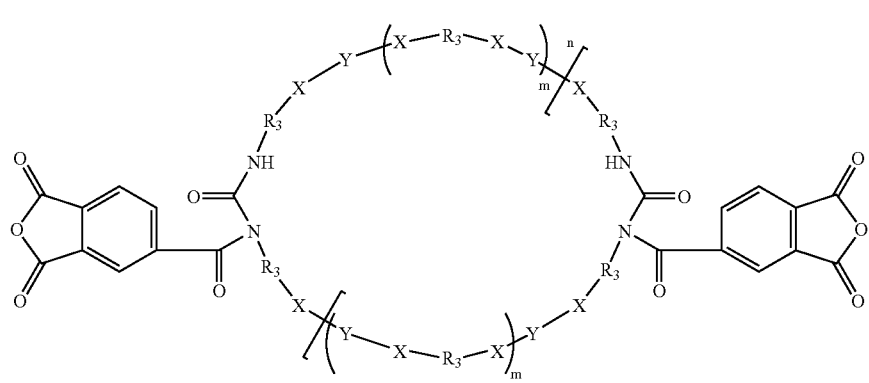

13 wherein:
$R_3$ is an aryl group;
X, Y, and n are as defined for the MC-CDI of Formula 1;
m is an integer from 1 to 5.

In the MC-ACU of Formula 9, 11, 12, or 13 according to the present invention, the preferred $R_3$ is

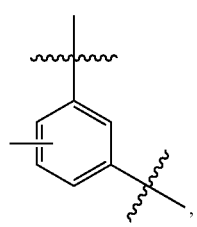

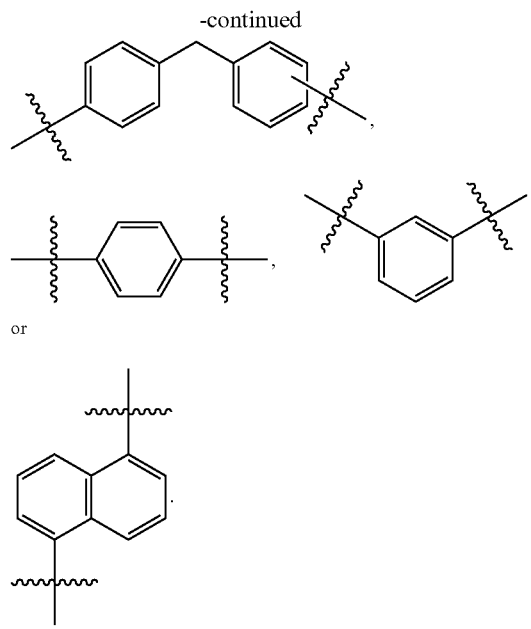

Process for Preparing MC-ACU, Functionalized MC-ACU

In the present invention, a fifth embodiment involves providing a process for preparing an MC-ACU of Formula 9,

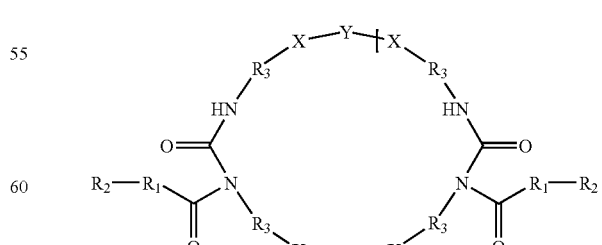

9 comprising the following steps:

(1) dissolving the MC-CDI of Formula 1 prepared according to the first embodiment in an inert organic solvent to form a solution;

(2) adding a molecule of Formula 10 to the solution from step (1);

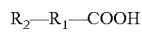

wherein:

$R_3$ is an aryl group;

X, Y, and n are as defined in the first embodiment described above;

$R_1$ is a hydrocarbon free radical having 2 to 20 carbon atoms;

$R_2$ is a carboxyl or an aliphatic hydroxyl;

thereby adding a carboxyl to carbodiimide functional group of the MC-CDI of Formula 1 to yield the MC-ACU.

In the present invention, a sixth embodiment involves providing a process for preparing an MC-ACU of Formula 11,

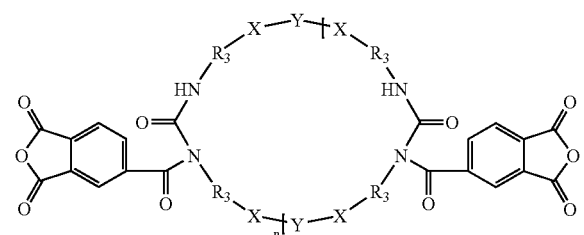

comprising the following steps:

(1) dissolving the MC-CDI of Formula 1 prepared according to the first embodiment in an inert organic solvent to form a solution;

(2) adding trimellitic anhydride into the solution from step (1);

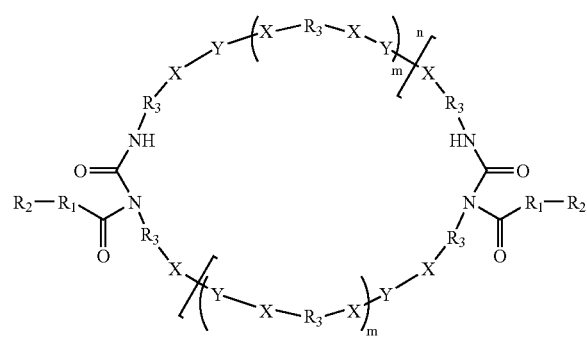

comprising the following steps:

(1) dissolving the MC-CDI of Formula 3 prepared according to the second embodiment in an inert organic solvent to form a solution;

(2) adding a molecule of Formula 10 into the solution from step (1);

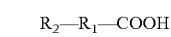

wherein:

$R_3$ is an aryl group;

X, Y, m, and n are as defined in the second embodiment described above;

$R_1$ is a hydrocarbon free radical having 2 to 20 carbon atoms;

$R_2$ is a carboxyl or an aliphatic hydroxyl;

thereby adding a carboxyl to carbodiimide functional group of the MC-CDI of Formula 3 to yield the MC-ACU.

In the present invention, an eighth embodiment involves providing a process for preparing an MC-ACU of Formula 13,

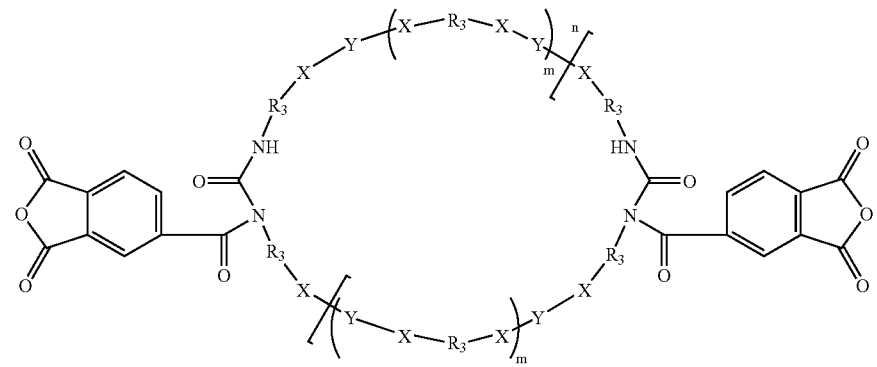

wherein:

$R_3$ is an aryl group;

X, Y, and n are as defined in the first embodiment described above;

thereby forming the MC-ACU having an anhydride functional group.

In the present invention, a seventh embodiment involves providing a process for preparing an MC-ACU of Formula 12, comprising the following steps:

(1) dissolving the MC-CDI of Formula 3 prepared according to the second embodiment in an inert organic solvent to form a solution;

(2) adding trimellitic anhydride into the solution from step (1);

wherein:

$R_3$ is an aryl group;

X, Y, and n are as defined in the first embodiment described above;

m is an integer from 1 to 5;

thereby forming the MC-ACU having an anhydride functional group.

In MC-ACU of Formula 9, 11, 12, or 13 prepared according to the processes in the fifth to the eighth embodiments of the present invention, the preferred $R_3$ is

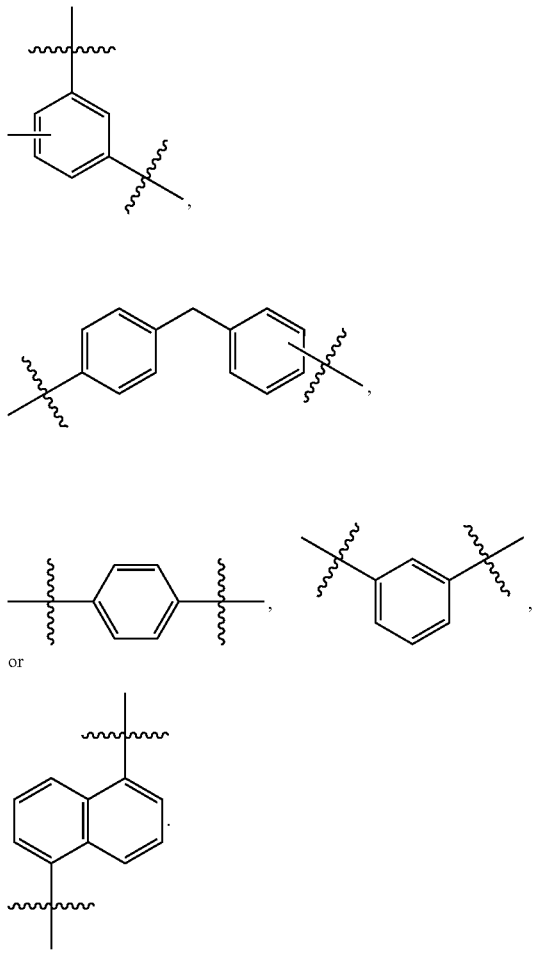

The process in the sixth (the eighth) embodiment according to the present invention, further comprises the following steps:

(3) dissolving the MC-ACU of Formula 11 (the MC-ACU of Formula 13) in an inert organic solvent to form a solution;

(4) adding water or a C1-C6 primary aliphatic alcohol to the solution from step (3);

thereby forming ortho-dicarboxylic acid functionalized or ortho-monocarboxylic acid monoester functionalized MC-ACU.

Process for Preparing Acid Functionalized MC-ACU/Anhydride Functionalized MC-ACU According to the present invention, the MC-CDI is reacted with dicarboxylic acid at a temperature of less than about 80° C. to yield an acid functionalized MC-ACU. The MC-CDI is reacted with trimellitic anhydride at a temperature of less than about 80° C. to yield an anhydride functionalized MC-ACU.

Moreover, the hydrolysis reaction is conducted between the anhydride functionalized MC-ACU and excessive, low-boiling anhydrous monoalcohol, such as methanol and ethanol. After the reaction is completed, the low-boiling anhydrous monoalcohol is removed, and the remaining product is dried to yield the MC-ACU product having an acid ester functional group in the terminal, i.e., an acid ester functionalized MC-ACU, with a yield of about 100%.

Production of Linear Organic Polymeric Material from Cyclic Polymer Intermediate by Ring-Opening Polymerization The functionalized MC-ACU according to the present invention is behaving as a A-B type monomer, in which functional groups A and B are reactable with each other, hence MC-ACU can be used as a cyclic polymer intermediate for synthesizing a linear organic polymeric material, based on the principle that the N-acylurea functional group can generate isocyanate upon mild thermolysis. Thus, the present invention also provides a process for synthesizing a linear organic polymeric material, comprising the following steps:

(1) dissolving aryl anhydride, aryl ortho-dicarboxylic acid, aryl ortho-monocarboxylic acid monoester, aliphatic carboxyl, or aliphatic hydroxyl functionalized MC-ACU in an inert organic solvent to form a solution;

(2) heating the solution from step (1) to a temperature of 90-200° C., preferably 120-170° C. for reaction;

thereby thermolysis of the N-acylurea functional group in the MC-ACU, to convert the MC-ACU into a linear molecular chain having an isocyanate functional group at one terminal and an anhydride functional group or a carboxyl or hydroxyl with active hydrogen at the other terminal; reacting the isocyanate functional group in the terminal of one linear molecular chain with the anhydride functional group or a carboxyl or hydroxyl with active hydrogen in another linear molecular chain to yield a linear organic polymeric material, particularly a linear organic polymeric material with an imide, an amide or a urethane linkage.

In the processes described above, a phospholene catalyst can be optionally added to increase the reaction rate when the carboxyl is at the other terminal of the linear molecular chain.

In particular, the present invention involves a process for synthesizing a linear organic polymeric material by utilizing the MC-ACU prepared according to the fifth to the eighth embodiments, comprising the following steps:

(1) dissolving the above MC-ACU or the MC-ACU prepared according to the fifth to the eighth embodiments in an inert organic solvent to form a solution;

(2) heating the solution from step (1) at a temperature of 90-200° C., preferably 120-170° C. for reaction;

thereby heating the N-acylurea functional group in the MC-ACU, to convert the MC-ACU into a linear molecular chain having an isocyanate functional group at one terminal and an anhydride functional group or a carboxyl or hydroxyl with active hydrogen at the other terminal; reacting the isocyanate functional group in the terminal of one linear molecular chain with the anhydride functional group or a carboxyl or hydroxyl with active hydrogen in another linear molecular chain to yield a linear organic polymeric material.

MC-U

Moreover, the present invention provides an MC-U, especially an MC-U of Formula 14,

14

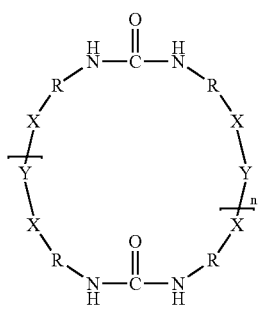

wherein:

R, X, Y, and n are as defined in the MC-CDI of Formula 1.

The present invention also provides an MC-U of Formula 15,

15

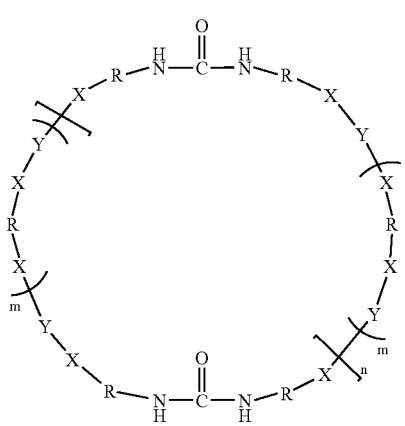

wherein:

R, X, Y, n, and m are as defined in the MC-CDI of Formula 3.

The present invention also provides an MC-U of Formula 16,

16

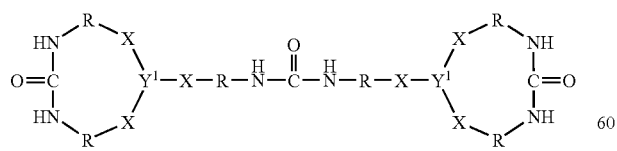

wherein:

R, X, $Y^1$ are as defined in the MC-CDI of Formula 5.

The present invention also provides an MC-U of Formula 17,

17

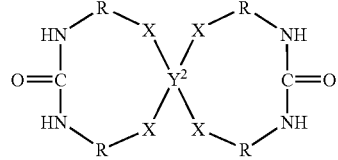

wherein:

R, X, and $Y^2$ are as defined in the MC-CDI of Formula 7.

In the MC-U of Formula 14, 15, 16, or 17 according to the present invention, the preferred R is

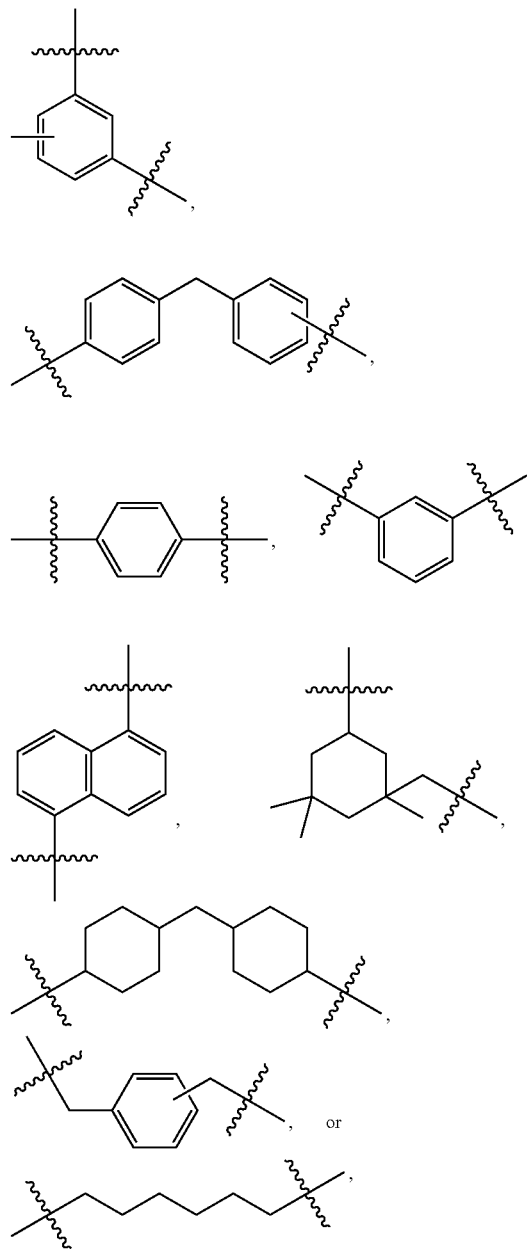

Process for Preparing MC-U

Furthermore, the present invention provides a process for synthesizing an MC-U, comprising high dilution of a molecule with multiple isocyanate terminal functional groups, and condensation of the isocyanate functional groups in the presence of a phospholene catalyst to prepare an MC-CDI, as well as the reaction of the MC-CDI with water at a temperature ranging from 0° C.-105° C. to obtain the MC-U.

Without any further description, one skilled in the art could utilize the present invention to its full extent based on the foregoing disclosures and the following examples. The examples will be available for illustration of practice of the claimed methods (processes) by those skilled in the art, but not intended to limit the other disclosures in any way.

EXAMPLES

In the following examples, the identification and test of a resultant product are conducted in the following manners:

Identification by Nuclear Magnetic Resonance spectrometer ($^1$H-NMR): dissolving a cyclic oligomer in d-acetone, and analyzing by a 200 MHz Varian Unity Inova FT-NMR spectrometer to identify the molecular structure of the cyclic oligomer;

Identification by Fourier-transform Infrared spectrometer (FTIR): after a cyclic oligomer or ring-opened polymer is coated on a salt flake (KBr) and dried, analyzing by a Fourier-transform Infrared spectrometer (Perkin Elmer Spectrum One FTIR Spectrometer) at a resolution of 4.0 cm$^{-1}$, and detecting the absorption spectrum of the cyclic oligomer and ring-opened polymer in IR;

Melting point apparatus: testing a melting point of a cyclic oligomer in a melting point apparatus (Fargo Melting Point Apparatus MP-2D) at a heating rate of 3° C./min.;

Differential Scanning Calorimetry (DSC): testing by a Seiko S II model SSC/5200 apparatus, and measuring a glass transition temperature (Tg) of a cyclic oligomer and ring-opened polymer on soft/hard segments, at a temperature ranging from −85° C. to 210° C. (up to 250° C. for testing a ring-opened polymer), a heating or cooling rate of 10° C./min, with nitrogen gas fed;

Gel Permeation Chromatography (GPC)—(DMF system): determining the MW and the MW distribution of the ring-opened polymer product with a Hitachi Apparatus (including an L-2130 Pump, and an L-2400 UV Detector); at 60° C. and a DMF solvent flow rate of 1.0 ml/min, first using PS standards known in molecular weight to create a calibration curve, then weighing and dissolving 0.002 g of each sample in 4.0 g DMF in LC level (concentration of 0.05%), after setting the detection wavelength at 284 nm or 308 nm, and injecting the solution into the apparatus to analyze;

Mass Spectroscope: using Finnigan/Thermo Quest MAT 95XL Mass Spectroscope to measure the MW of the MC-CDI by Fast Atom Bombardment (FAB);

Elemental Analysis: using Elementar vario EL III to determine weight percent of carbon, hydrogen, nitrogen in the MC-CDI structure.

Example 1

Synthesis of Narrow MW Dispersed Prepolymer Containing Isocyanate Functional Group in the Terminal In a 250 ml three-necked flask, 0.02 mol PPG having different MW and 0.042 mol 2,4-TDI were added. Under a nitrogen system, a reaction was conducted under the reaction controlling conditions as shown in Table 1. When the reaction was completed, all of the products were transparent colorless liquids (see Scheme 4).

TABLE 1

Optimal reaction controlling conditions for synthesizing the prepolymer of 2,4-TDI and PPG

| Sample number | Poly(propylene glycol) used (PPG) | Reaction controlling conditions | |
|---|---|---|---|
| | | Temperature(° C.) | Reaction time (min) |
| T2P192 | TPG | 45 | 50 |
| T2P400 | 400 | 50 | 40 |
| T2P700 | 700 | 50 | 50 |
| T2P2000 | 2000 | 65, 70 | 30 (65° C.), 15 (70° C.) |

Exemplified by the isocyanate prepolymer prepared from PPG700 and 2,4-TDI, the $^1$H-NMR spectrogram was shown in FIG. 1.

Example 2

Preparation of MC-CDI

Each of the prepolymers (T2Pm) having different MWs from Example 1 was diluted by directly pouring a large amount of solvent (1500 ml toluene, conc.=0.013 mol/L) into the reactor. After adding DMPO, a cyclization reaction was conducted by heating to 90° C. The cyclization reaction was FTIR-monitored. When the characteristic peak on FTIR completely transformed from NCO (IR=2269 cm$^{-1}$) to CDI (IR=2134 cm$^{-1}$), the reaction was stopped. Subsequently, the reaction solution was concentrated, and dried under reduced pressure at 40° C. to 50° C., to obtain a crude product MC-CDI-T2Pm. (see Scheme 4).

The crude product MC-CDI-T2Pm was purified by liquid column chromatography on silica gel (60-230 micron) by using ethyl acetate (EAc) or ethyl acetate (EAc)/n-hexane in a volume ratio of 9:1, to obtain a solution of target product MC-CDI in EAc. After being concentrated and dried under reduced pressure at 40° C. to 50° C., the purified MC-CDI-T2Pm was obtained. The isolated yields of the MC-CDIs having different MWs were shown in Table 2.

TABLE 2

Results of the MC-CDIs having different MWs purified by liquid column chromatography

| Sample number | Cyclization time (hr) | Yield (%) | Appearance | Melting point (° C.) | Polyether segment Tg (° C.) |
|---|---|---|---|---|---|
| MC-CDI-T2P192 | 21 | 60 | Faint yellow powder crystal | 80.5–85.2[a] | 18.0 |
| MC-CDI-T2P400 | 18 | 67 | Faint yellow colloid | 16 and 22[b] | 6.7 |
| MC-CDI-T2P700 | 20 | 40 | Faint yellow colloid | — | 3.8 |
| MC-CDI-T2P2000 | 27 | 18 | Faint yellow colloid | — | −49.0 |

[a]measured by melting point apparatus (3° C./min)
[b]measured by DSC (10° C./min)

Figure 2:
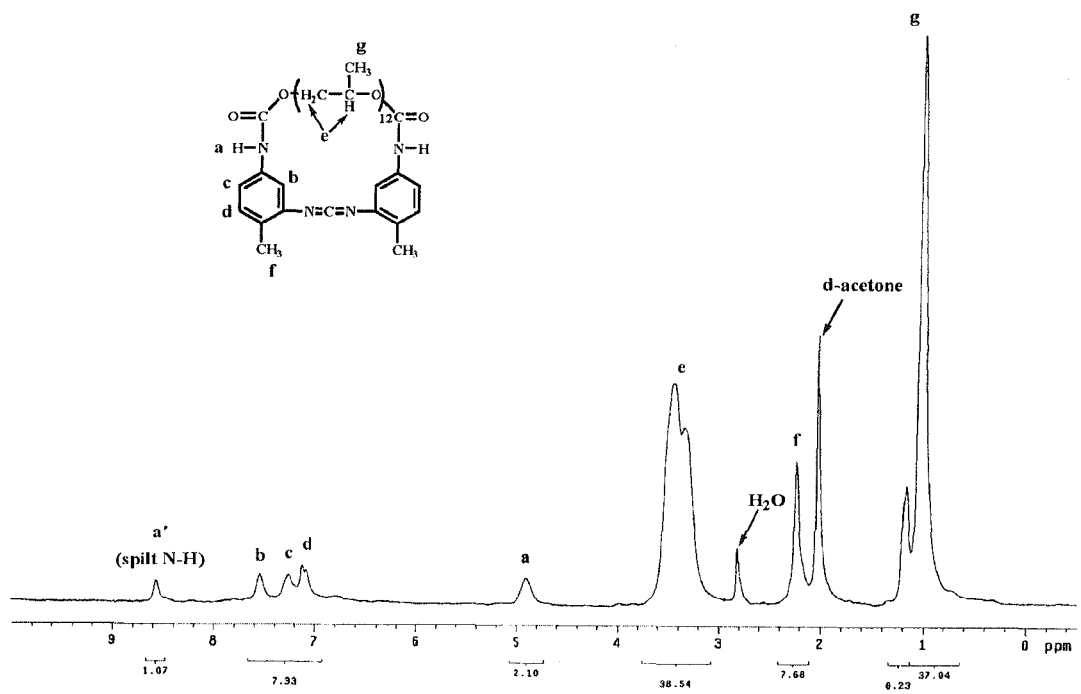
FIG. 2 shows a $^1$H-NMR spectrogram of the MC-CDI-T2P700 according to Example 2 of the present invention, testing with d-acetone as a solvent.

Exemplified by T2P700, the $^1$H-NMR spectrogram of the resultant MC-CDI-T2P700 was shown in FIG. 2.

Figure 3:
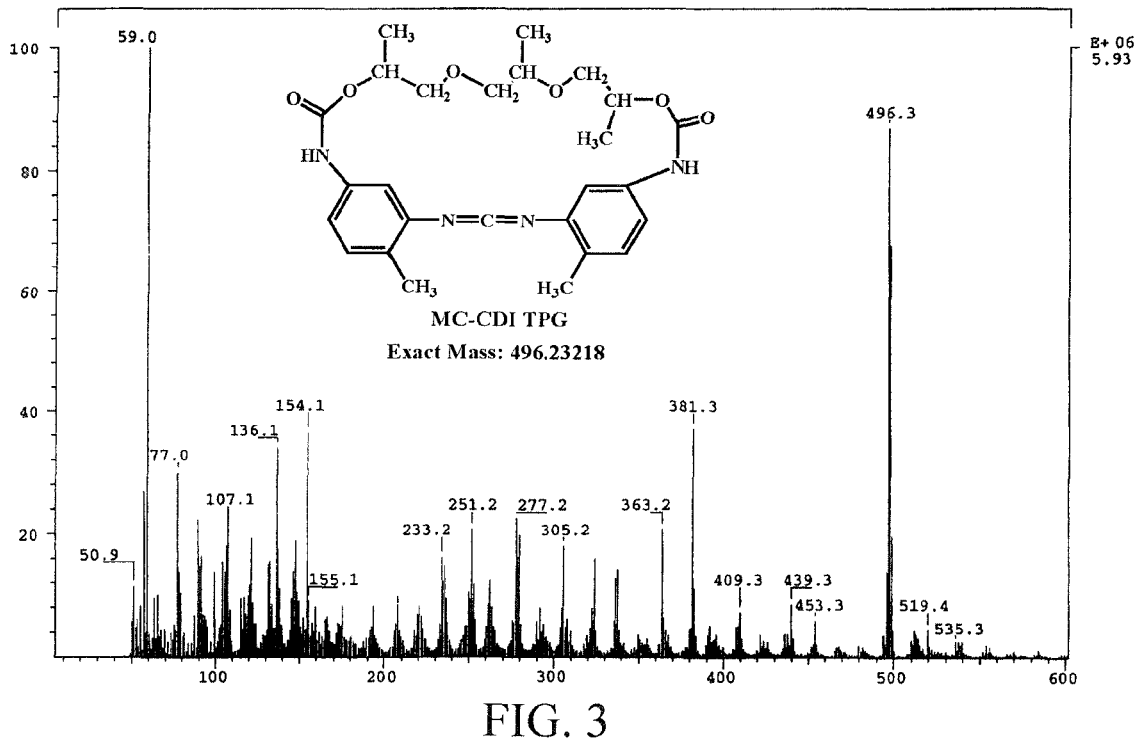
FIG. 3 shows a mass spectrogram of the MC-CDI-T2P192 according to Example 2 of the present invention.

To avoid the failure to accurately verify whether the MC-CDI compound according to the present invention has a ring structure, affected by the complex structure and uneven distribution of the MW of the high MW PPG segment, the MC-CDI-T2P192 synthesized from TPG with precise polyether segment length was exemplified, of which the elemental analysis and mass spectrogram were respectively shown in Table 3 and FIG. 3. From the results of Table 3, the experimental value for each element was almost consistent with the theoretical value, with a deviation within 0.2%. It was indicated in FIG. 3 that the absolute MW (496.3) for MC-CDI-T2P192 was consistent with the theoretical value (496.23218). Therefore, it was confirmed that the MC-CDI compound according to the present invention has a ring structure.

TABLE 3

The elemental analysis results of the resultant MC-CDI (MC-CDI-T2P 192)

|  | N % | C % | H % | O %[a] |
|---|---|---|---|---|
| Experimental value | 11.30 | 63.04 | 6.34 | 19.32 |
|  | 11.18 | 63.03 | 6.48 | 19.31 |
| Theoretical value | 11.28 | 62.89 | 6.50 | 19.33 |

[a]O % = 100% − N % − C % − H %

Scheme 4

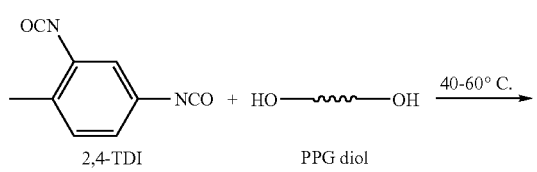

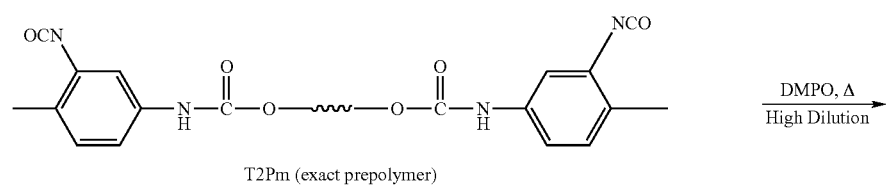

T2Pm (exact prepolymer)

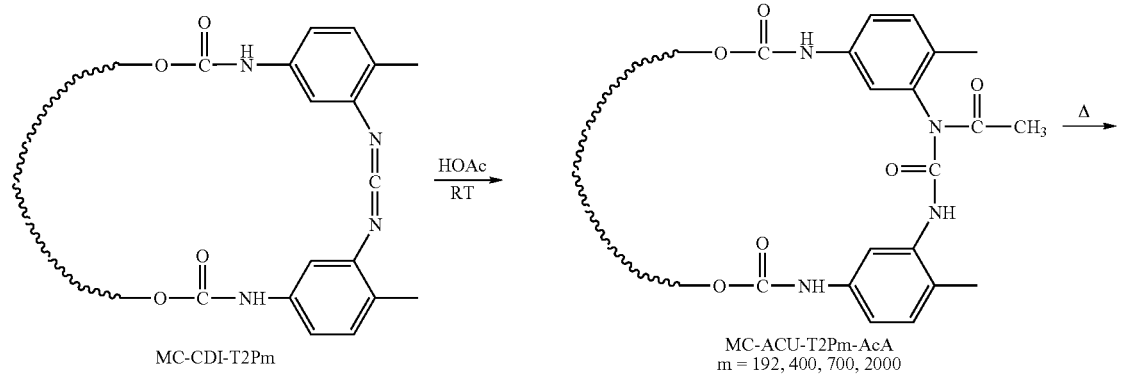

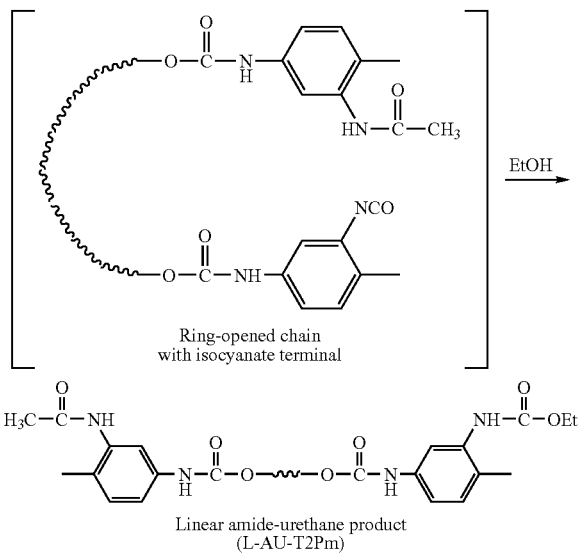

Example 3

Synthesis of MC-ACU

In a 100 ml three-necked flask, the purified MC-CDI-T2Pm ($9.3 \times 10^{-4}$ mol) with various PPG chain lengths from Example 2, and excessive acetic acid (AcA) ($9.3 \times 10^{-3}$ mol, 0.56 g) were added, and 20 ml toluene was added finally. The mixture reacted at normal temperature, and the reaction was monitored by FTIR and TLC. When the CDI characteristic peak (IR=2134 $cm^{-1}$) on FTIR completely disappeared, the reaction was completed (8 hours). The resultant product was dehydrated by adding anhydrous $MgSO_4$, and filtered, and then the solvent was removed, to give a product with a yield of greater than 98% (see Scheme 4).

Example 4

Figure 4:
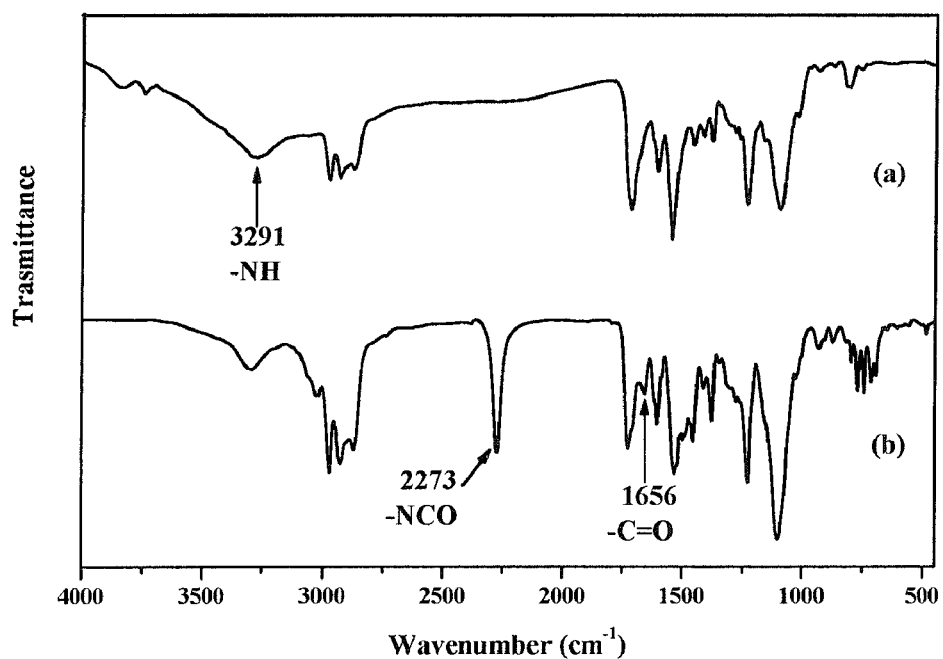
FIG. 4 shows the IR monitoring on the ring-opening reaction of MC-ACU-T2P700-AcA according to Example 4 of the present invention:
  (a) original MC-ACU-T2P700-AcA;
  (b) MC-ACU-T2P700-AcA which was ring-opened at 130° C.

Ring-Opening Reaction of MC-ACU 2 g macrocyclic acylurea 700 synthesized with acetic acid (MC-ACU-T2P700-AcA) was weighed and dissolved in 30 ml xylene to form a solution, and the solution was added into a 100 ml three-necked flask. Under nitrogen system, the temperature of the solution was raised slowly in an oil bath. The ring-opening reaction was monitored with FTIR, and the temperature and rate were observed when the NCO characteristic peak (IR=2270 $cm^{-1}$) generated, as shown in FIG. 4. Finally, after the completion of monitoring at 140° C., the heating source was removed and excessive anhydrous ethanol was added slowly to a mixture of the flask and stirred for 30 min. After the reaction was completed, the solvent was removed, and the remaining product was dried to obtain a linear product, amide-urethane (L-AU-T2P700). The ring-opening reaction flowchart was shown in Scheme 4.

Figure 5:
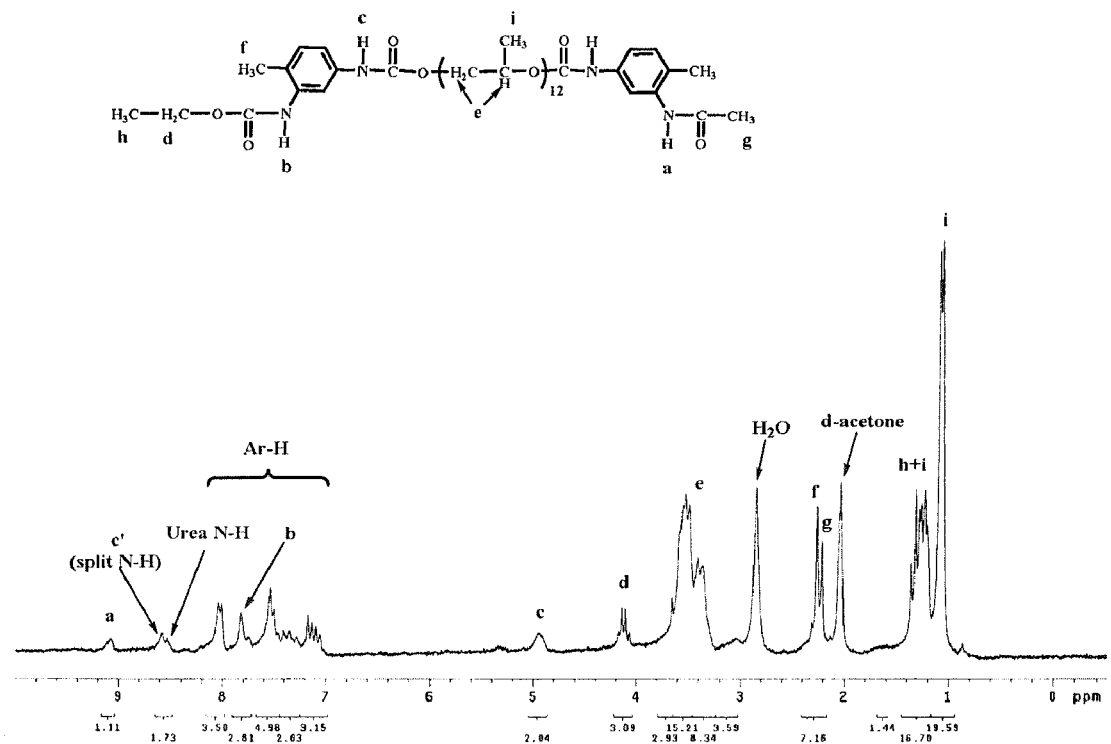
FIG. 5 shows a $^1$H-NMR spectrogram of L-AU-T2P700 as the ring-opening reaction product according to Example 4 of the present invention, testing with d-acetone as a solvent.

Exemplified by MC-ACU-T2P700-AcA, the $^1$H-NMR spectrogram of the resulted amide-urethane linear product was shown in FIG. 5.

Figure 6:
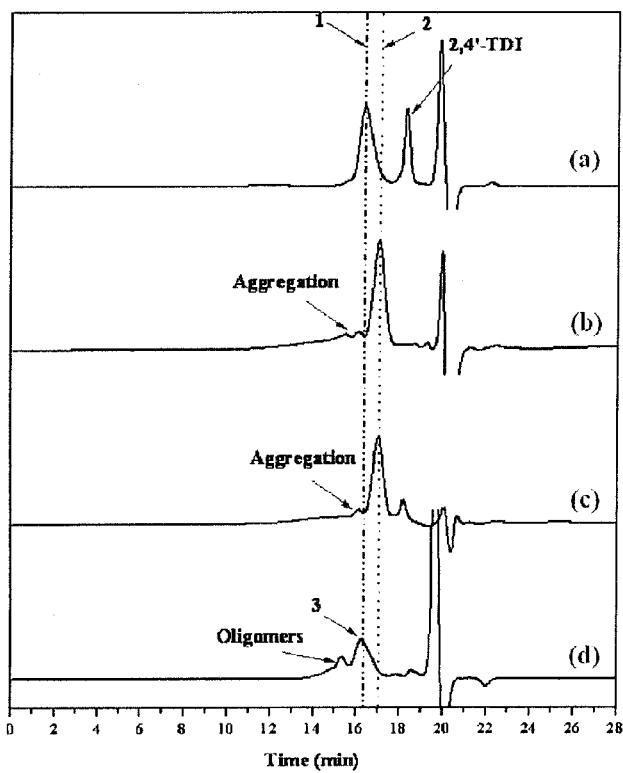
FIG. 6 shows the GPC chromatograms of the PPG 700 based linear molecules and macrocycles according to Examples 1-4 of the present invention:
  (a) isocyanate prepolymer (T2P700); (b) MC-CDI-T2P700;
  (c) MC-ACU-T2P700-AcA; (d) L-AU-T2P700.

Exemplified by isocyanate prepolymer with PPG 700 chain length (T2P700), MC-CDI-T2P700, MC-ACU-T2P700-AcA, and ring-opened product L-AU-T2P700 thereof, the GPC analysis was shown in FIG. 5. Compared with the linear molecules, the macrocycles have a low hydrodynamic volume, i.e., exhibiting a long detention time in gel permeation chromatography. As can be seen from FIG. 6, all the macrocycles had a longer detention time than the corresponding linear molecules. Therefore, it is confirmed that the molecules according to the present invention have a ring structure.

Example 5

Synthesis and Ring-Opening Polymerization of Acid Functionalized MC-ACU

Figure 7:
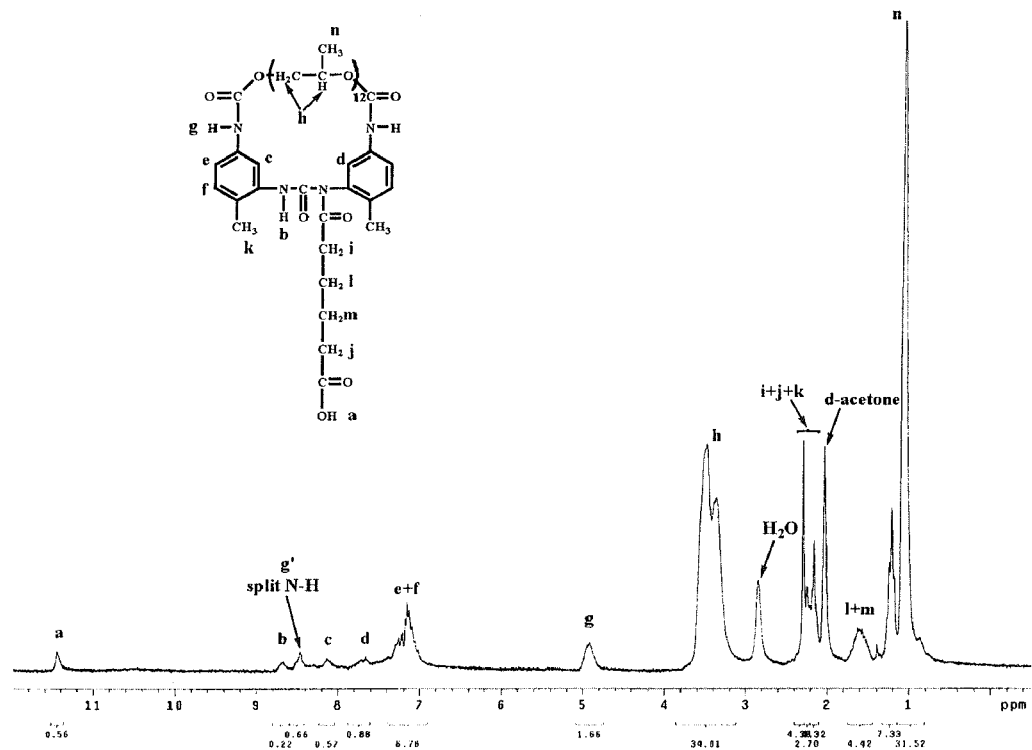
FIG. 7 shows a $^1$H-NMR spectrogram of the acid functionalized MC-ACU (MC-ACU-T2P700-AdA) according to Example 5 of the present invention, testing with d-acetone as a solvent.

In a 100 ml three-necked flask, the purified MC-CDI-T2P700 ($9.3 \times 10^{-4}$ mol) and excessive adipic acid (AdA) ($9.3 \times 10^{-3}$ mol, 1.36 g) were added; and 15 ml anhydrous THF and 10 ml toluene were finally added. The reaction was conducted at normal temperature and monitored by FTIR and TLC. When the CDI characteristic peak (IR=2134 cm$^{-1}$) on FTIR completely disappeared, the reaction was completed (about 20 to 22 hours). The solvent was removed at normal temperature, 20 ml toluene was added to a mixture of the flask, and a large amount of white powder of unreacted adipic acid precipitate was formed and then filtered. The solvent in the filtrate was removed, and the above purification steps were repeated several times. Finally, the resultant product was dehydrated by adding anhydrous MgSO$_4$, filtered, and then placed into a vacuum oven for drying at 30° C. for 5 hours, to obtain the MC-ACU product having a carboxylic acid functional group in the terminal (MC-ACU-T2P700-AdA), with a yield of greater than 98%. The reaction flowchart was shown in Scheme 5. The $^1$H-NMR spectrogram of the acid functionalized MC-ACU (MC-ACU-T2P700-AdA) obtained was shown in FIG. 7.

The ring-opening polymerization of the acid functionalized MC-ACU can be conducted by sequential self-repetitive reaction (SSRR) mode to prepare a linear poly(amide-urethane) (PAU) polymer. The reaction flowchart was shown in Scheme 5. The SSRR mode is a sequential self-repetitive reaction consisting of three self-repetitive steps. The first step is the thermolysis of 1.0 mole of an aryl N-acylurea yielding 1.0 mole of an amide or amide-imide as a product and concurrently generating 1.0 mole of an aryl isocyanate. The second step is the catalytic conversion of 1.0 mole of the aryl isocyanate into 0.5 mole of an aryl CDI. Lastly, the third step is the reaction between the 0.5 mole of the aryl CDI and a carboxylic acid to form another 0.5 mole of the aryl N-acylurea as an isolable intermediate. Thus, it points to the fact that, 50% of the aryl isocyanate was consumed in a one full cycle of the SSRR to form 50% of the amide or amide-imide. When provided with an enough amount of carboxylic acid, the three sequential reactions are repeated to eventually consume all the aryl N-acylureas, aryl isocyanates, and aryl CDIs.

0.5 g of MC-ACU-T2P700-AdA was dissolved in 10 ml anhydrous toluene to form a solution, and the solution was added into a 100 ml three-necked flask. Under flushing with nitrogen stream, the temperature was controlled at 110° C. with an oil bath to reflux. In order to allow the monomer to react completely, the monomer in solution was traced by TLC until it completely disappeared. After the reaction was completed, the solution was filtered, and the colloidal solid was dissolved in trace DMF. Then a large amount of toluene was added to the flask and the resultant product was filtered. The purification steps were repeated several times. Finally, the purified resultant product was placed into a vacuum oven to dry at 80° C. for 4 hours. A PAU linear copolymer, with a yield of 86%, a number average molecular weight (Mn) of about 50,000, PDI of 1.894, Tg of the soft segment of –43° C., and the Tg of hard segment of 147° C. was obtained.

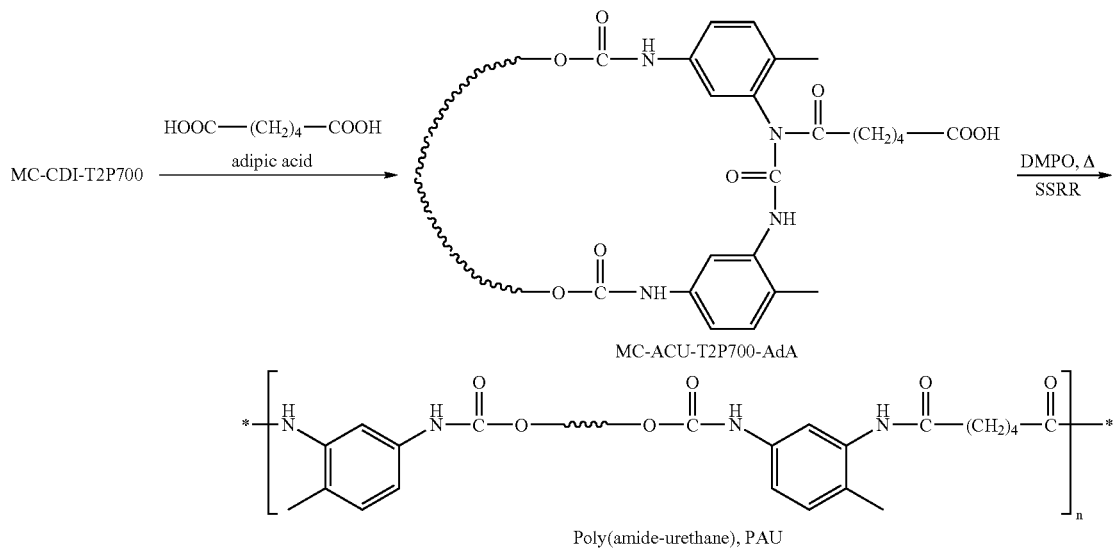

Scheme 5

Example 6

Figure 8:
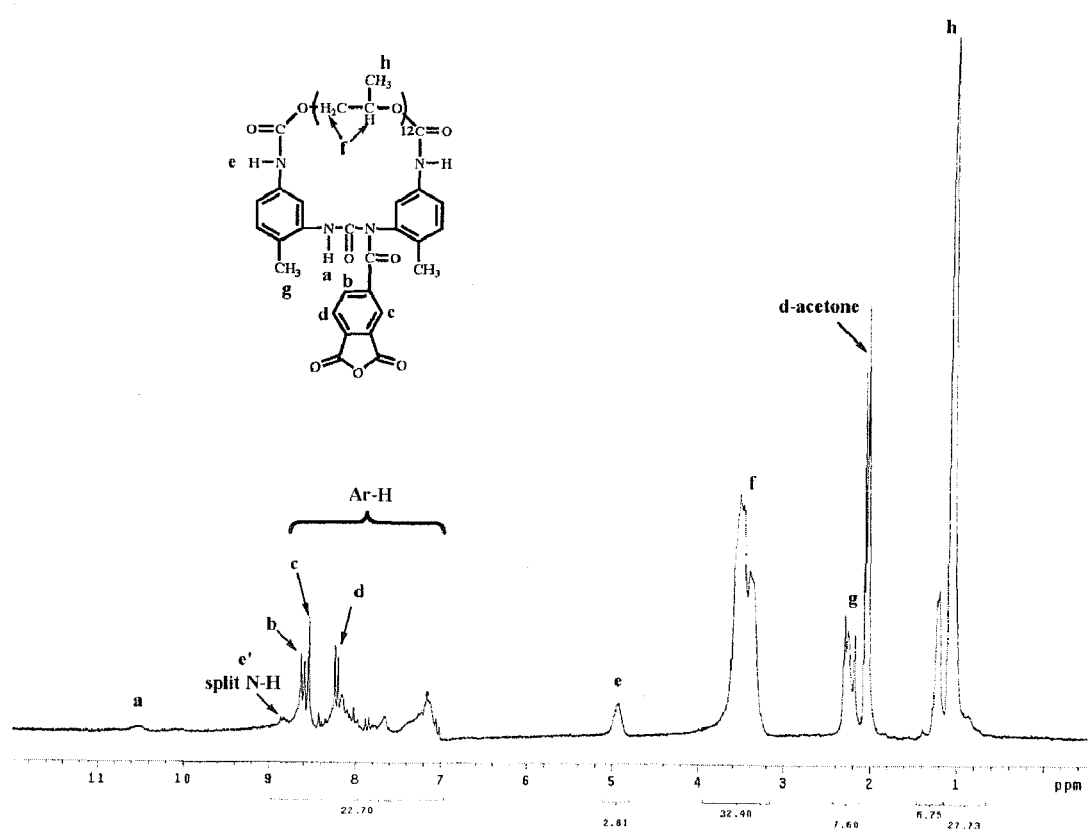
FIG. 8 shows a $^1$H-NMR spectrogram of the anhydride functionalized MC-ACU (MC-ACU-T2P700-TMA) according to Example 6 of the present invention, testing with d-acetone as a solvent.

Synthesis and Ring-Opening Polymerization of Anhydride Functionalized MC-ACU and acid-ester functionalized MC-ACU In a 100 ml three-necked flask, the purified MC-CDI-T2P700 ($9.3 \times 10^{-4}$ mol) and excessive trimellitic anhydride (TMA) ($9.3 \times 10^{-3}$ mol, 1.79 g) were added, and 15 ml anhydrous THF and 10 ml toluene were finally added. The reaction was conducted at normal temperature and monitored by FTIR and TLC. When the CDI characteristic peak (IR=2134 cm$^{-1}$) on FTIR completely disappeared, the reaction was completed (about 12 to 15 hours). Upon removal of solvent followed by addition of 20 ml toluene, a large amount of white powder of unreacted TMA precipitant was formed and then filtered. The solvent in the filtrate was removed and the above purification steps were repeated several times. Finally, the resultant product was dehydrated by adding anhydrous MgSO$_4$, filtered, and dried, to give the MC-ACU product having an anhydride functional group in the terminal (MC-ACU-T2P700-TMA) with a yield of greater than 98%. The reaction flowchart was shown in Scheme 6. The $^1$H-NMR spectrogram of the anhydride functionalized MC-ACU (MC-ACU-T2P700-TMA) obtained was shown in FIG. 8.

The anhydride functionalized MC-ACU can be further converted into an acid ester functionalized MC-ACU. In a 100 ml three-necked flask, MC-ACU-T2P700-TMA ($9.3 \times 10^{-4}$ mol) and 50 ml excessive anhydrous ethanol were added. The reaction was conducted at normal temperature under flushing with nitrogen stream for 3 hours. Finally, the anhydrous ethanol was removed, and the resultant product was dried, to obtain the MC-ACU product having an acid ester functional group in the terminal (MC-ACU-T2P700-TAE), with a yield of about 100%. The reaction flowchart was shown in Scheme 6.

the temperature was controlled at 130° C. with an oil bath. In order to allow the monomer to react completely, the monomer in solution was traced by TLC until it completely disappeared. After the reaction was completed, the solvent was removed by a rotation evaporator. The concentrate was placed in a vacuum oven, and dried at 120° C. for 5 hours, which aimed to completely eliminate ethanol from the esters and convert the ester functional group into an imide functional group. Finally, the colloidal solid was dissolved in trace DMF, and then a large amount of cyclohexane was added, and the mixture was filtered. The purification steps were repeated several times, and the resultant product was dried to obtain a PAIU linear copolymer, with a yield of 88%. The molecular weight of the product exhibited dual distributions, in which, for one, the weight-averaged molecular weight (Mw) was about 760,000, PDI was 1.620, integration area was 60% and for the other, Mw was about 44,000, PDI was 1.233, integration area was about 40%, and for the mixed soft/hard segment, Tg was −6.6° C., for the hard segment, Tg was 213° C.

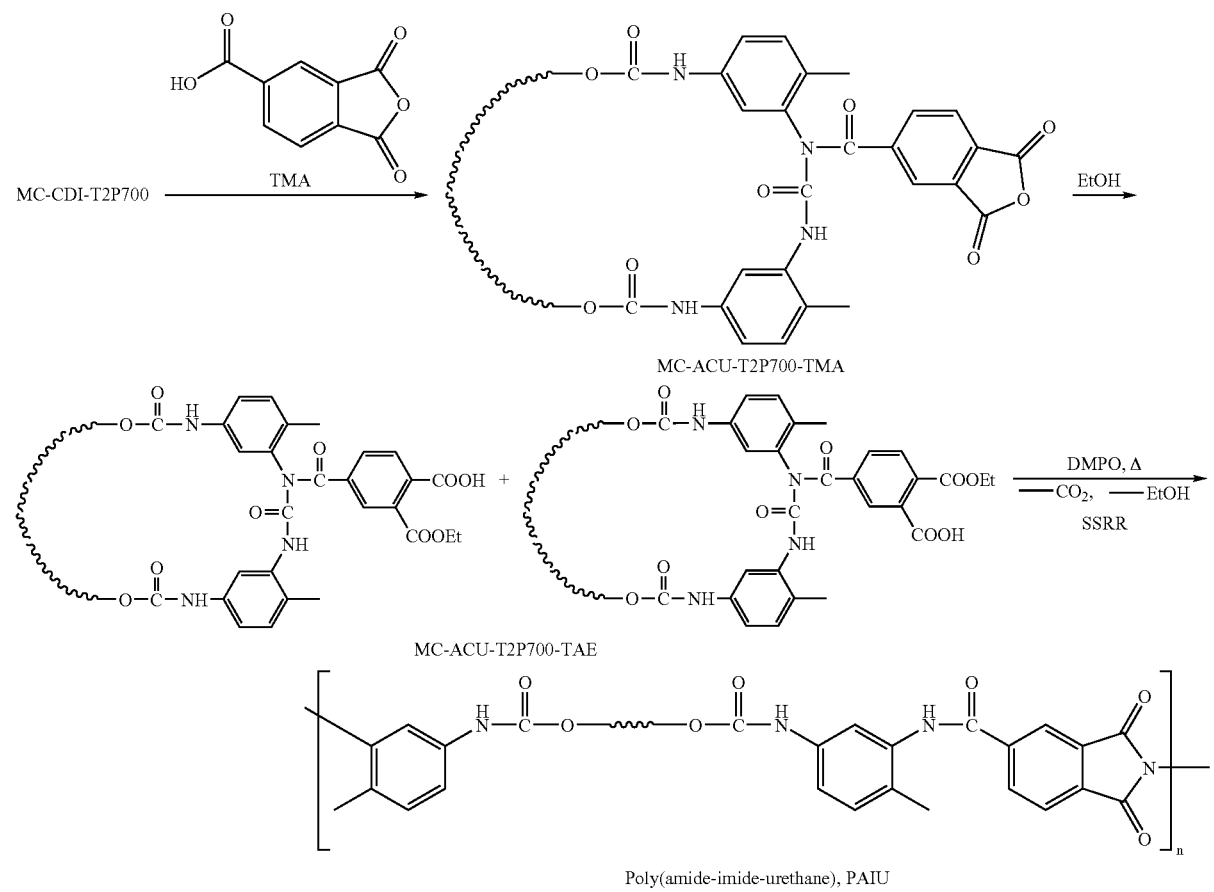

Poly(amide-imide-urethane), PAIU

The ring-opening polymerization of the acid ester functionalized MC-ACU may be conducted by SSRR mode to prepare a linear poly(amide-imine-urethane) (PAIU) polymer. The reaction flowchart was shown in Scheme 6. 0.5 g MC-ACU-T2P700-TAE was dissolved in 10 ml anhydrous anisole to form a solution, and the solution was added into a 100 ml three-necked flask. Under flushing with nitrogen gas, Example 7

Synthesis of MC-Urea (MC-U)

In a 100 ml three-necked flask, the purified MC-CDI-T2Pm ($9.3 \times 10^{-4}$ mol) was added and dissolved in 20 ml mixed solvent of acetone/water, and then a drop of conc. HCl (37%) as a catalyst was added. The reaction was monitored by FTIR. When the CDI characteristic peak (IR=2134 cm-1) completely disappeared, the reaction was completed. After the reaction was completed, the solvent was removed by a high vacuum rotation evaporator at normal temperature, and the concentrate was placed into a vacuum oven to dry at 50° C. for 3 hours. The MC-U product (MC-U-T2Pm), with a yield of great than 99% was obtained.

Figure 9:
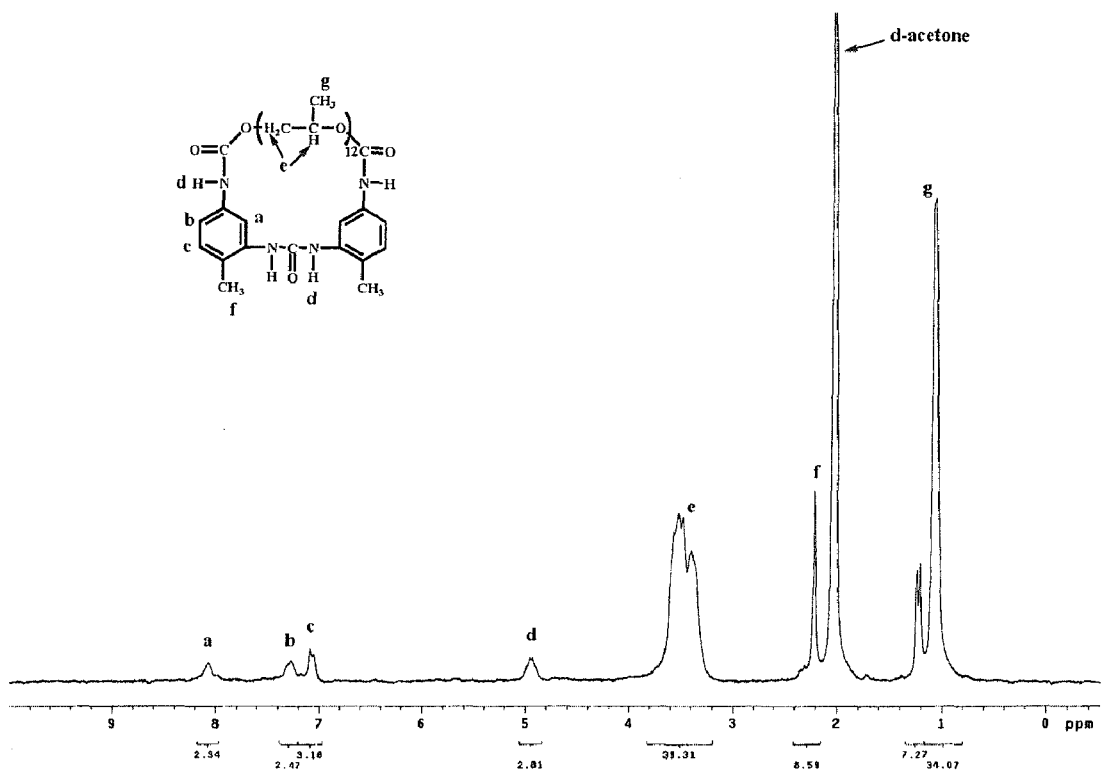
FIG. 9 shows a $^1$H-NMR spectrogram of MC-U (MC-U-T2P700) according to Example 7 of the present invention, testing with d-acetone as a solvent.

The reaction flowchart was shown in Scheme 7 (which shows the reaction equation and structure of MC-Urea). Exemplified by MC-CDI-T2P700, the $^1$H-NMR spectrogram of the MC-U MC-U-T9P700 obtained was shown in FIG. 9.

Scheme 7

MC-CDI-T2Pm

MC-U-T2Pm
m = 192, 400, 700, 2000

Example 8

MC-CDI as Hydrolysis Stabilizer

The resultant MC-CDI molecules without being subject to column chromatograph were added to polyester polyol, and the mixture was stirred at 120° C. for 6 hours per day for a total of 8 days. Finally, the acid value of the polyester polyol was measured by titration. As seen from table 4, the acid value of the polyester polyol was significantly reduced to 0.1 upon addition of 0.5 wt % MC-CDI molecules, regardless of whether the MC-CDI-T2P2000 had the minimum content of carbodiimide functional group.

TABLE 4

The acid value variation after addition of MC-CDI molecules in polyester polyol

| Sample number | MC-CDI molecule | Addition amount (wt %) | Acid value (mg KOH/g) |
|---|---|---|---|
| 0 | None | 0 | 1.2 |
| 400-1 | MC-CDI-T2P400 | 0.5 | 0.1 |
| 400-2 | MC-CDI-T2P400 | 1.0 | 0.1 |
| 700-1 | MC-CDI-T2P700 | 0.5 | 0.1 |
| 700-2 | MC-CDI-T2P700 | 1.0 | 0.1 |
| 700-3 | MC-CDI-T2P700 | 2.0 | 0.1 |
| 2000-1 | MC-CDI-T2P2000 | 0.5 | 0.1 |
| 2000-2 | MC-CDI-T2P2000 | 1.0 | 0.1 |
| 2000-3 | MC-CDI-T2P2000 | 2.0 | 0.1 |

It should be readily understood that a variety of improvements are feasible, and conceivable and expected for those skilled in the art.

What is claimed is:

1. A macrocyclic carbodiimide (MC-CDI) of Formula 1,

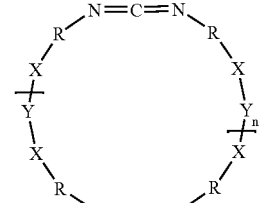

wherein:

R is 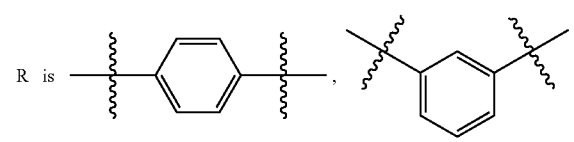

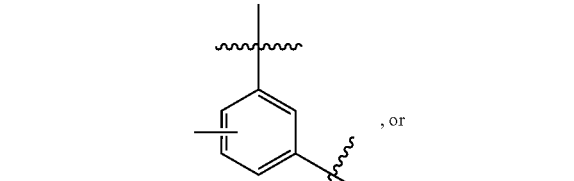, or

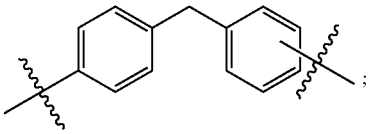;

X is urethane (NHCOO);

Y is poly(propylene glycol), poly(tetramethylene glycol), poly(alkylene adipate), polycaprolactone, poly(caprolactone-b-oxyalkylene-b-caprolactone), polybutadiene diol, or poly(alkylene carbonate), having molecular weight from 100-3500; and n is 0 or 1.

2. A process for preparing an MC-CDI of Formula 1,

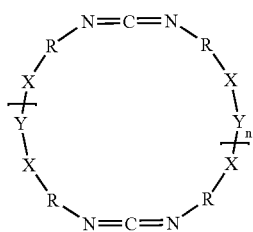
(1)

comprising the following steps:
(1) high dilution of a molecule of Formula 2 with an inert organic solvent;

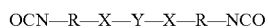
(2)

(2) condensation of isocyanate functional groups of the molecule of Formula 2 in the presence of a phospholene catalyst;

wherein:
Formula 2 is an isocyanate-terminated prepolymer made from OCN—R—NCO and HO—Y—OH;

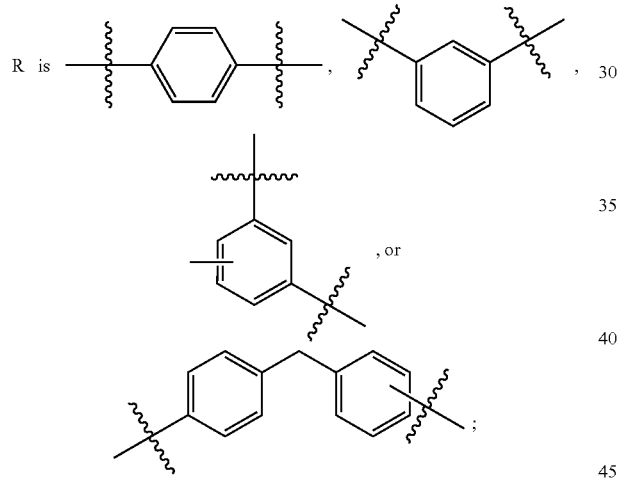

X is urethane (NHCOO);
Y is poly(propylene glycol), poly(tetramethylene glycol), poly(alkylene adipate), polycaprolactone, poly(caprolactone-b-oxyalkylene-b-caprolactone), polybutadiene diol, or poly(alkylene carbonate), having a molecular weight from 100 to 7000; and
n is 0 or 1.

3. The process as claimed in claim 2, further comprising in the step (1), addition of a molecule of Formula 4

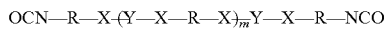
(4)

wherein:
Formula 4 is an isocyanate-terminated prepolymer made from OCN—R—NCO and HO—Y—OH;

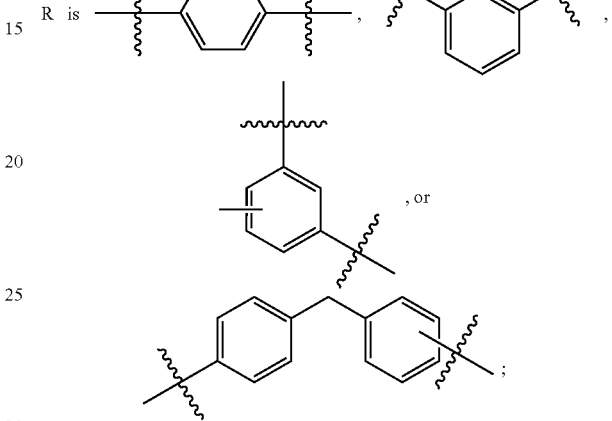

X is urethane (NHCOO);
Y is poly(propylene glycol), poly(tetramethylene glycol), poly(alkylene adipate), polycaprolactone, poly(caprolactone-b-oxyalkylene-b-caprolactone), polybutadiene diol, or poly(alkylene carbonate), having a molecular weight from 100 to 7000; and
m is an integer from 1 to 5.

4. The process as claimed in claim 3, wherein in the step (1), the molecules of Formulas 2 and 4 are present in a form of a mixture before high dilution with the inert organic solvent, and high dilution of the mixture with the inert organic solvent.

5. The process as claimed in claim 2, wherein the phospholene catalyst is 1,3-dimethyl-3-phospholene oxide (DMPO).

6. The process as claimed in claim 3, wherein the phospholene catalyst is 1,3-dimethyl-3-phospholene oxide (DMPO).

* * * * *